(12) United States Patent
Pan et al.

(10) Patent No.: US 8,670,302 B2
(45) Date of Patent: Mar. 11, 2014

(54) ACTIVATION SIGNALING IN TRANSPORT NETWORKS

(75) Inventors: Ping Pan, San Jose, CA (US); Rajan Rao, Santa Clara, CA (US); Biao Lu, Saratoga, CA (US); Sri Mohana Satya Srinivas Singamsetty, Bangalore (IN); Ann Q. Gui, Cupertino, CA (US); Maneesh Jain, Uttaranchal (IN); Anthony W. Jorgenson, Fremont, CA (US); Jan Bialkowski, San Jose, CA (US); Khuzema Pithewan, Bangalore (IN)

(73) Assignee: Infinera Corporation, Sunnyvale, CA (US)

( * ) Notice: Subject to any disclaimer, the term of this patent is extended or adjusted under 35 U.S.C. 154(b) by 250 days.

(21) Appl. No.: 12/872,985

(22) Filed: Aug. 31, 2010

(65) Prior Publication Data

US 2011/0305136 A1    Dec. 15, 2011

Related U.S. Application Data

(60) Provisional application No. 61/353,438, filed on Jun. 10, 2010.

(51) Int. Cl.
*H04J 1/16* (2006.01)

(52) U.S. Cl.
USPC .......................... 370/218; 370/222

(58) Field of Classification Search
USPC .................................. 370/216–228
See application file for complete search history.

(56) References Cited

U.S. PATENT DOCUMENTS

| | | | |
|---|---|---|---|
| 2004/0190444 A1* | 9/2004 | Trudel et al. | 370/224 |
| 2006/0193257 A1* | 8/2006 | Behzadi | 370/230 |
| 2007/0211623 A1* | 9/2007 | Nishioka | 370/218 |
| 2008/0117806 A1* | 5/2008 | Xu | 370/217 |
| 2008/0285440 A1* | 11/2008 | Adler | 370/223 |
| 2010/0208662 A1* | 8/2010 | Vilella et al. | 370/328 |
| 2010/0232287 A1* | 9/2010 | Long et al. | 370/220 |
| 2011/0058472 A1* | 3/2011 | Owens et al. | 370/228 |
| 2011/0064404 A1* | 3/2011 | Eiger et al. | 398/2 |
| 2011/0305450 A1* | 12/2011 | Pan et al. | 398/8 |
| 2012/0176911 A1* | 7/2012 | Pan et al. | 370/241.1 |

* cited by examiner

*Primary Examiner* — Andrew Lee
(74) *Attorney, Agent, or Firm* — Dunlap, Codding LLP; David L. Soltz

(57) ABSTRACT

A method comprising the steps of receiving a signal indicative of a failure of a working connection in a mesh network having a headend node, a tailend node and an intermediate node, and having a protecting connection, and transmitting an activation message via the protecting connection from at least one of the headend node and the tailend node to the intermediate node for activating the protecting connection.

15 Claims, 24 Drawing Sheets

ACTIVATION SIGNALING IN TRANSPORT NETWORKS

CROSS-REFERENCE TO RELATED APPLICATIONS

The present patent application claims priority to the U.S. Provisional patent application identified by U.S. Ser. No. 61/353,438 filed on Jun. 10, 2010, the entire content of which is hereby incorporated herein by reference.

FIELD OF THE DISCLOSURE

The disclosure generally relates to methods and apparatuses for support traffic protection and recovery in mesh networks having multiple nodes communicating via communication links. The disclosure enables operators of the nodes to activate protecting connections to redirect user traffic within a short time interval, upon the detection of network failure on one or multiple working connections. Multiple working connections and protecting connections may share the same set of network resources for optimal resource utilization. Though the methodologies set forth herein are in the context of a shared mesh network that is optically based, such methodologies may apply to all transport networks that utilize protection and recovery provisioning.

BACKGROUND

Multiprotocol label switching (MPLS) is a scheme in high-performance telecommunication networks which directs and carries data from one node to the next node. The multiprotocol label switching mechanism assigns labels to data packets. Packet forwarding decisions from one node to the next node are made solely on the contents of the label for each data packet, without the need to examine the data packet itself.

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial multiplexing (e.g. incoming port or fiber to outgoing port or fiber). Multiplexing, such as time-division multiplexing is when 2 or more signals or bit streams are transferred simultaneously. In particular, time-division multiplexing (TDM) is a type of digital multiplexing in which 2 or more signals or bit streams are transferred simultaneously as sub-channels in one communication channel, but are physically taking turns on the communication channel. The time domain is divided into several recurrent timeslots of fixed length, one for each sub-channel. After the last sub-channel, the cycle starts all over again. Time-division multiplexing is commonly used for circuit mode communication with a fixed number of channels and constant bandwidth per channel. Time-division multiplexing differs from statistical multiplexing, such as packet switching, in that the timeslots are returned in a fixed order and preallocated to the channels, rather than scheduled on a packet by packet basis.

Generalized Multiprotocol Label Switching includes protection and recovery mechanisms which specifies predefined (1) working connections within a shared mesh network having multiple nodes and communication links for transmitting data between the nodes; and (2) protecting connections specifying a different group of nodes and/or communication links for transmitting data in the event that one or more of the working connections fail. In other words, when a working connection fails, the Generalized Multiprotocol Label Switching protocol automatically activates one of the protecting connections into a working connection for redirecting data within the shared mesh network.

However, the protection and recovery mechanisms defined in GMPLS have overlooked a number of issues when scaling to large optical shared mesh networks including switch over latency, and predictable protection. Predictable protection allows recovery in a fixed period of time. In the context of optical shared mesh networks using GMPLS protocols, there is no guarantee that a recovery will be within a fixed period of time. With respect to switch-over latency, in shared mesh network protection schemes, the protecting connections require explicit activation on the nodes during a traffic recovery procedure for redirecting data to the protecting connection. Activation using standard GMPLS signaling may take seconds, if not longer, to propagate and process, and thus may not be acceptable in shared mesh networks operated by a carrier. This is because GMPLS routes messages using an IGP (interior gateway protocol) protocol using flooding to notify all other known nodes of any network changes to the nodes. Flooding is a typical mechanism used in mesh networks to send a message simultaneously to all known nodes in the mesh network. With respect to predictable protection, shared resource availability information is not normally flooded due to scalability concerns because in a given mesh network, the amount of shared resource information which needs to be flooded could be very large, i.e., (number of nodes+number of links+number of Shared Risk Link Groups)*number of communication links. In GMPLS, nodes are assigned into Shared Risk Link Groups and a risk factor is assigned to each of the Shared Risk Link Groups. Nodes within the Shared Risk Link Groups are also notified of a failure which increases the amount of information to be shared. An alternative to flooding is through trial-and-error mechanisms where nodes automatically try to solve the failure through setting up alternative paths, such as crankback. Crankback is a mechanism used by networks to overcome failures and reduce flooding. In particular, crankback is used when a node along a selected connection cannot accept the request, the node automatically attempts to discover an alternative path to the final destination. In any event, the operators need to be aware of usable protecting connections in order to provide predictable traffic protection.

Traffic protection and recovery in shared mesh networks can be categorized in three general areas: "Cold standby"; "Hot standby" and "Warm standby". Cold standby refers to a mechanism where the nodes will compute a new route upon the detection of a connection failure and then configure new connections to implement the new route. A delay associated with such computation and configuration may be in the range of seconds, which is not acceptable in many service provider networks. However, many IP shared mesh networks have adapted the cold standby approach.

Hot standby refers to a mechanism where a node within the shared mesh network will automatically provision at least one protecting connection to a working connection. In the event of network failure, user traffic can be directed to the protecting connection without additional configuration. The SONET APS scheme follows the hot standby approach and establishes a protecting connection and a working connection in parallel. In the SONET APS scheme, the working connection is used to carry user traffic at any given time. When the working connection has failed, the protecting connection will start to pick up user traffic with less delay than the cold standby mechanism. However, a drawback to the hot standby mechanism is that the protecting connections may consume too much network resources and may not be practical in many networks.

Warm standby is a mechanism where a node within a shared mesh network configures one or more protecting connections prior to a failure of a working connection without consuming additional network resources. In the warm standby mechanism, one of the nodes referred to as a "headend" node will transmit "wake-up" messages to pre-established nodes identified as part of the protecting connection to activate the protecting connection. The GMPLS protocols utilize the warm standby mechanism. Though the warm standby mechanism has the advantage of improved resource utilization, the current specification for GMPLS has two key drawbacks: (a) the activation utilizes the GMPLS routing and signaling protocols which are run by the control plane and which result in significant and unacceptable delays and (b) there is no scalable mechanism for the operators to be aware of the availability of the protecting connections.

The presently disclosed and claimed inventive concepts are preferably developed on top of the warm standby mechanism described above and eliminate the described drawbacks.

SUMMARY

In one version, the disclosure is directed to a method in which a signal indicative of a failure of a working connection is received in a mesh network having a headend node, a tailend node and an intermediate node, and having a protecting connection. An activation message is transmitted via the protecting connection from at least one of the headend node and the tailend node to the intermediate node for activating the protecting connection. Once the protecting connection is activated, then traffic can be transmitted using the protecting connection. The activation message can be transmitted in-band, e.g., on a General Communication Channel of the protecting connection.

In another version, the headend node includes a first line module and a second line module. In this version, the signal indicative of the failure of the working connection is received by the first line module of the headend node. The activation message can be transmitted by the second line module of the headend node.

In yet another version, the at least one of the headend node and the tailend node that transmits the activation message includes a control module and a switch. The control module can store first information identifying the first protecting connection. In this version, the first line module retrieves the first information identifying the first protecting connection from the control module, and generates, by circuitry within the first line module, second information including the activation message. The second information is supplied to a second line module by bypassing the control module. The second line module can be coupled to a link that is part of the protecting connection. Then, the link is activated with circuitry provided in the second line module, in response to the second information, such that the second line module supplies data to the protecting connection.

The protecting connection can be a first protecting connection, the intermediate node can be a first intermediate node, and the activation message can be a first activation message. In another aspect, the headend node waits for a message from the tailend node indicating that the first protecting connection is activated, and in an absence of receiving the message selects a second protecting connection and transmits a second activation message to a second intermediate node of the second protecting connection.

In another aspect, the activation message can be transmitted using multiprotocol label switching protocols (MPLS) including an MPLS header, and the activation message can be transmitted as a network packet with a TTL parameter of 1.

In yet another version, the disclosure describes a method in which one of a headend node and a tailend node receives a signal indicative of a failure of a working connection in a shared-mesh protection GMPLS network having the working connection and a protecting connection for passing user traffic. An activation message is transmitted that complies with a protocol other than a routing and signaling protocol of the shared-mesh protection GMPLS network from at least one of the headend node and the tailend node to at least one intermediate node of the protecting connection for activating the protecting connection.

The protocol other than the routing and signaling protocol of the shared-mesh protection GMPLS network can comply with an MPLS protocol, and also can be transmitted via the protecting connection on an in-band communication channel, such as a General Communication Channel. In another aspect, the activation message can be transmitted by a communication link that is not a part of the protecting connection. Alternatively, the activation message can be transmitted using multiprotocol label switching protocols (MPLS) including an MPLS header, and/or can be transmitted as a network packet with a TTL parameter of 1.

In another version, the disclosure is directed to a node. The node is provided with an input interface, an output interface, a switch and a control module. The input interface receives traffic from a first communication link, and the output interface transmits traffic to a second communication link. The switch communicates the traffic from the input interface to the output interface, and the control module utilizes GMPLS protocols and controls the input interface, the output interface and the switch. The control module stores connection information indicative of a working connection, and at least one protecting connection. The input interface can be configured to receive a signal indicative of a failure of the working connection, form an activation message to activate a first protecting connection, and then pass the activation message to the output interface by using the switch and bypassing the control module.

In one aspect, the input interface is configured to download connection information indicative of the working connection from the control module, and to form the activation message utilizing the connection information.

In another aspect, the input interface includes a first line module having one or more processors, and the output interface includes a second line module having one or more processors, and wherein the first line module uses the one or more processors to generate the activation message responsive to the first line module receiving the signal indicative of the failure of the working connection, and to supply the activation message to the second line module by bypassing the control module.

In yet another aspect, the output interface is connected to a link forming a part of the protecting connection, and wherein the output interface utilizes circuitry to supply the activation message to the link.

In a further aspect, the output interface can be configured to supply the activation message on a General Communication Channel of the link.

In yet another version, the disclosure is directed to a method in which a fault is detected in a working connection with the working connection being a first path in a mesh network including a plurality of nodes, one of the plurality of nodes including a first line module, a second line module and a control plane. First information identifying a protecting connection is supplied to the first line module. The protecting connection is a second path in the mesh network. Circuitry provided in the first line module, generates second information including an activation message for activating the protecting connection. The second information is supplied to the second line module by bypassing the control plane. The second line module is coupled to a link with the link being part of the protecting connection. Then, circuitry provided in the second line module activates the link in response to the second information, such that the second line module supplies data to the protecting connection.

In yet another aspect, a plurality of time-division multiplexed frames can be supplied to said one of the plurality of nodes with one of the plurality of time-division multiplexed frames including the first information. Said one of the plurality of time-division multiplexed frames can include a General Communication Channel (GCC), the GCC including the first information.

In yet another aspect, said one of the plurality of nodes includes a first input and a second input, and the method further includes the steps of supplying third information including supervisory information associated with the mesh network to a first input of said one of the plurality of nodes and supplying the data to a second input of said one of the plurality of nodes. The supervisory information can be carried by an input signal that complies with an Internet Protocol (IP). In yet another aspect, the protecting connection is a first protecting connection and the data is first data. In this aspect, third information identifying a second protection connection is supplied to said one of the plurality of nodes, the link being included in the second protecting connection; and a first priority associated with the first protecting connection and a second priority associated with the second protecting connection is determined. In this aspect, the link is activated based on the first priority.

BRIEF DESCRIPTION OF THE DRAWING

The accompanying drawings, which are incorporated in and constitute a part of this specification, illustrate one or more implementations described herein and, together with the description, explain these implementations. In the drawings.

DETAILED DESCRIPTION

Figure 1:
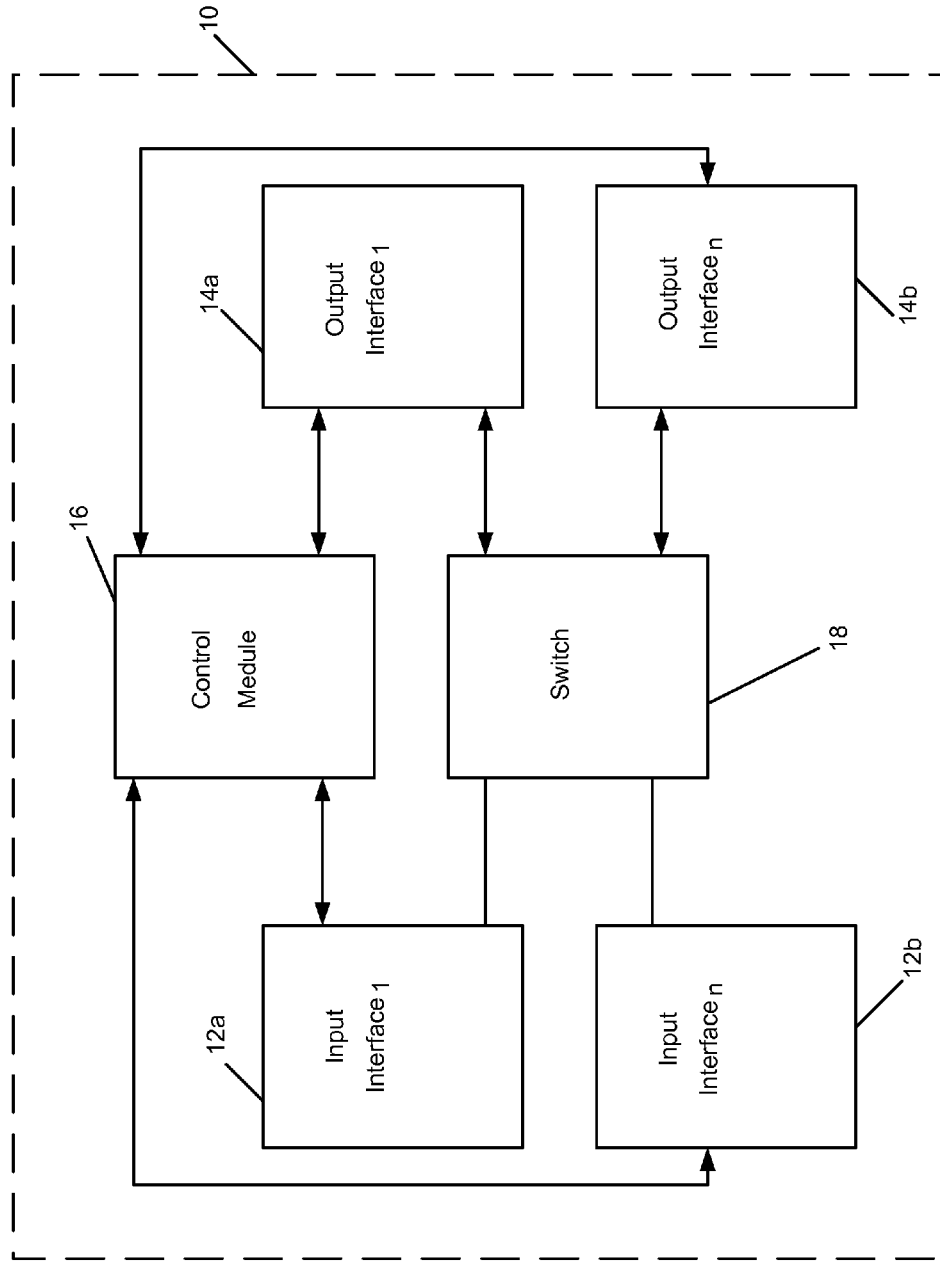
FIG. 1 is a block diagram of an exemplary node constructed in accordance with the present disclosure for communicating via a mesh network.

The following detailed description refers to the accompanying drawings. The same reference numbers in different drawings may identify the same or similar elements.

DEFINITIONS

If used throughout the description and the drawings, the following short terms have the following meanings unless otherwise stated:

APS stands for Automatic Protection Switching Technology.

DCC stands for Dedicated Data Communication Channels.

GCC stands for General Communication Channel which is an in-band side channel used to carry transmission management and signaling information within Optical Transport Network elements.

GACH stands for Generic Associated Channel Header.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). GMPLS is a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Multi-Protocol Label Switching network. Note that Label Switched Paths are unidirectional; they enable packets to be label switched through the Multiprotocol Label Switched network from one endpoint to another. Since bidirectional communication is typically desired, a Label Switched Path is typically set up for each direction to compensate for the unidirectional nature of the Label Switched Path.

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OTN stands for Optical Transport Network which includes a set of optical switches which are connected by optical fiber links.

SONET/SDH stands for Synchronous Optical Networking/Synchronous Digital Hierarchy which are standardized multiplexer protocols that transfer multiple digital bit streams over optical fiber using lasers or light emitting diodes.

Rx stands for Receiver which typically refers to optical channel receivers, but can also refer to circuit receivers.

TTL stands for Time To Live and is a field in the header of a network packet (or message) that sets the number of hops through which the network packet or message travels.

Tx stands for Transmitter which typically refers to optical channel transmitters, but can also refer to circuit transmitters.

The terms SID, TID and PID refer to Slot Identification, TIM Identification and Port Identification, respectively. The terms SID, TID and PID are used to identify the system component for message delivery.

Figure 3:
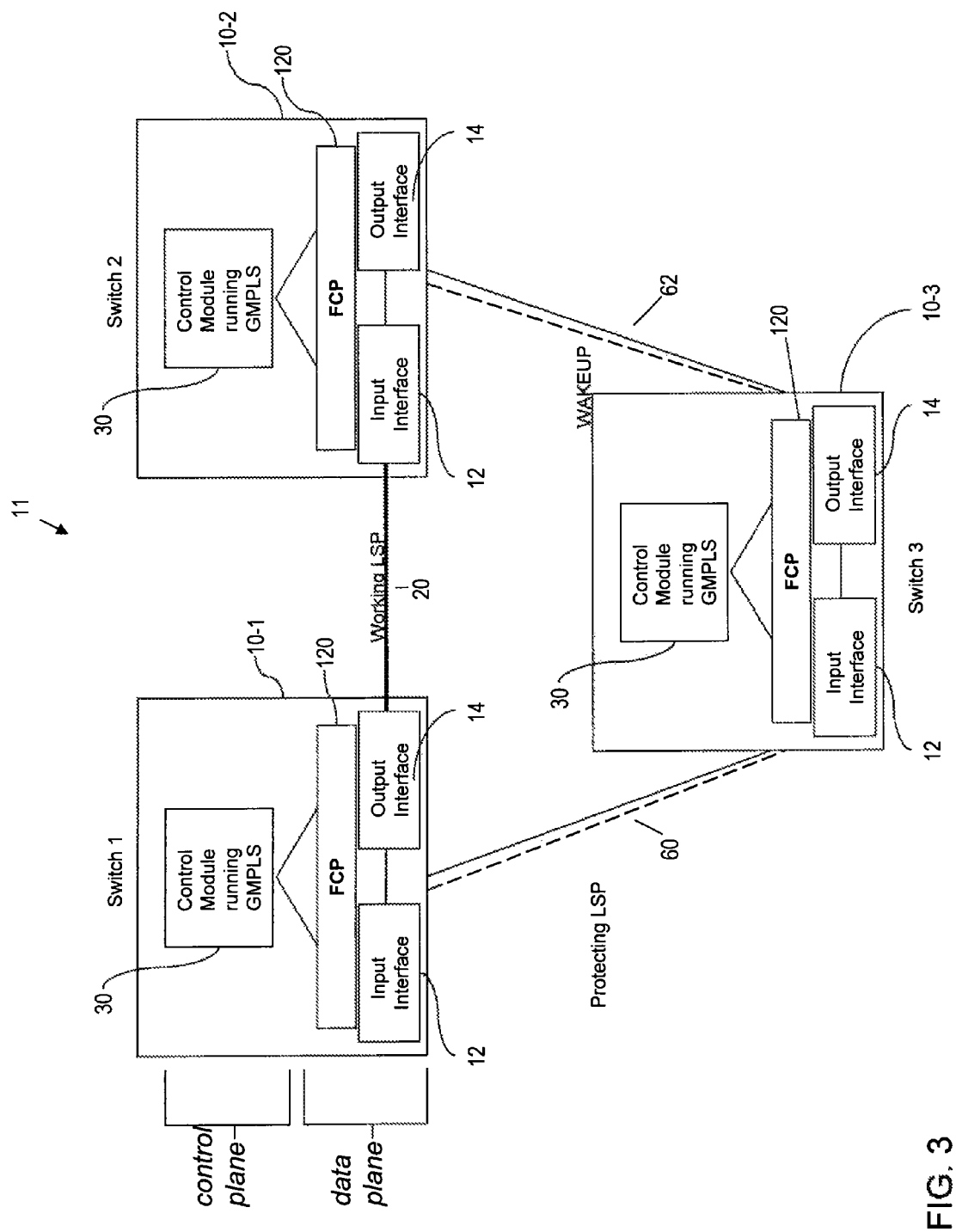
FIG. 3 is a block diagram of a mesh network formed of multiple nodes in accordance with the present disclosure with the nodes configured with a working connection and at least one protecting connection.

Referring now to the drawings, and in particular to FIG. 1, shown therein and designated by reference numeral 10 is an exemplary node constructed in accordance with the present disclosure. As will be discussed in more detail below, the node 10 is adapted to facilitate the communication of data (which may be referred to herein as "traffic") between multiple nodes 10 in a mesh network 11 (as shown in FIG. 3). The node 10 is provided with one or more input interfaces 12, one or more output interfaces 14, a control module 16, and a switch 18.

In general, the input interfaces 12 are adapted to receive traffic from the mesh network 11, and the output interfaces 14 are adapted to transmit traffic onto the mesh network 11. The switch 18 serves to communicate the traffic from the input interface(s) 12, to the output interface(s) 14. And, the control module 16 serves to control the operations of the input interfaces 12, the output interfaces 14, and the switch 18.

The node 10 can be implemented in a variety of manners, including, commercial installations having one or more backplanes (not shown), racks, and the like. In this example, the input interfaces 12, the output interfaces 14, the control module 16 and the switch 18 are typically implemented as separate devices, which may have their own power supply, local memory and processing equipment. In another example, the node 10 can be implemented as a single device having a shared power supply, memory and processing equipment. Or, in another example, the node 10 can be implemented in a modular manner in which one or more of the input interfaces 12, the output interfaces 14, the control module 16 and the switch 18 share a power supply and/or housing.

The input interfaces 12, and the output interfaces 14 of one node 10 are adapted to communicate with corresponding input interfaces 12, and output interfaces 14 of another node 10 within the mesh network 11 via a communication link 20 (as shown in FIG. 3). An example of an input interface 12 and/or an output interface 14 is an Ethernet card or optical port. In general, each of the input interfaces 12 and/or the output interfaces 14 may have a unique logical identification, such as an IP address. The communication link 20 can be implemented in a variety of manners, such as a physical link including electrical (e.g., copper wire or coax) and/or optical signal (e.g., optical fiber or other waveguide) carrying capabilities, or as a wireless link. The implementation of the input interfaces 12, and the output interfaces 14 will depend upon the particular type of communication link 20 that the particular input interface 12 and/or output interface 14 is designed to communicate with. For example, one of the input interfaces 12 can be designed to communicate wirelessly with another node 10 within the mesh network 11, while one of the output interfaces 14 of the node 10 can be designed to communicate optically through a fiber-optic link. For a particular node 10, the input interfaces 12 can be of the same type or different types; the output interfaces 14 can be of the same type or different types; and the input and output interfaces 12 and 14 can be of the same type or different types.

Figure 2:
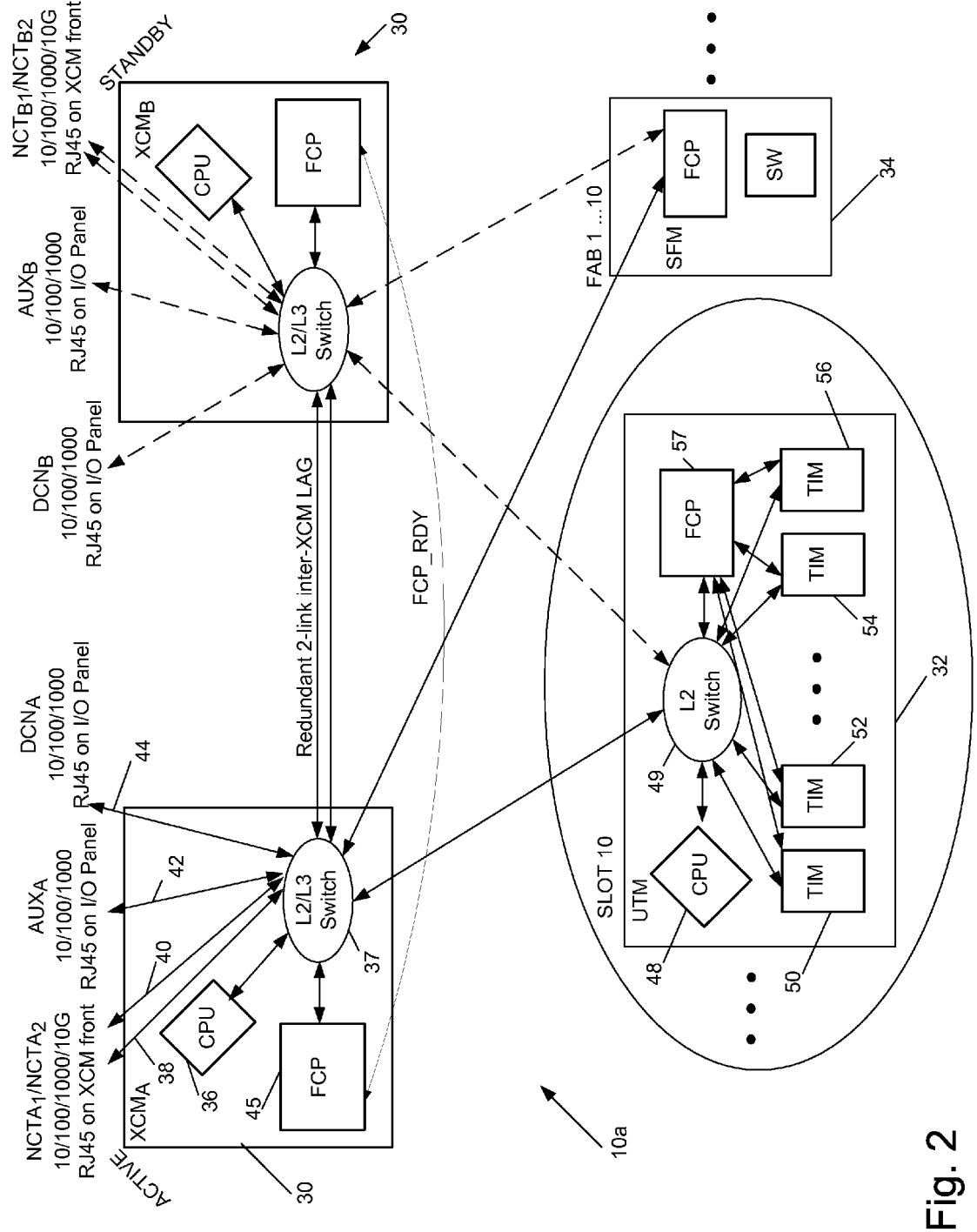
FIG. 2 is a block diagram of a particular embodiment of a node constructed in accordance with the present disclosure.

Referring now to FIG. 2, shown therein is a particular embodiment of a node 10a where such node 10 is implemented in a modular manner. The node 10a is provided with one or more exchange control modules (XCM) 30, one or more universal transport modules (UTM) 32, and one or more switch fabric modules 34. In the example depicted in FIG. 2, the node 10a is provided with at least two exchange control modules 30, with at least one of the exchange control modules 30 being actively used, and the other one of the exchange control modules 30 being available as a backup in the event the actively used exchange control module 30 fails or is taken off-line. In general, the exchange control modules 30 are particular implementations of the control module 16 depicted in FIG. 1; the universal transport module 32 is a particular implementation of the input interfaces 12 and the output interfaces 14; and the switch fabric module 34 is a particular implementation of the switch 18.

In general, the exchange control module 30 is provided with one or more processors 36, which is shown by way of example as a CPU. However, it should be understood that the processors 36 can be implemented in other manners such as field programmable gate array(s) (FPGA), digital signal processor(s), or the like. The exchange control module(s) 30 are also provided with a L2/L3 switch 37 (i.e. Layer 2/Layer 3 switch). The exchange control module(s) 30 are also provided with one or more input/output interfaces which are shown by way of example as the arrows 38, 40, 42, and 44. The exchange control modules 30 are also provided with a FCP module 45. The FCP module 45 may be used to transfer alarms and time-sensitive critical messages such as activation messages.

The universal transport module 32 is provided with one or more processors 48; one or more L2 switch 49; and one or more transport interface modules 50, 52, 54, and 56 communicating with the L2 switch 49 (i.e., Layer 2 switch). The L2 switch 49 also communicates with the control plane L2/L3 switch 37 for communicating control messages between the universal transport module 32 and the exchange control module(s) 30. The one or more processors 48 is shown by way of example as a CPU; however, it should be understood that the one or more processors 48 can be implemented in other manners such as a field programmable gate array(s) (FPGA), digital signal processor(s), or the like. Certain ones of the transport interface modules 50, 52, 54 and 56 form input interfaces, and other ones of the transport interface modules 50, 52, 54 and 56 form output interfaces. For example, the transport interface modules 50 and 52 can form input interfaces, and the transport interface modules 54 and 56 can form output interfaces.

The universal transport module 32 can be provided with a fast control plane 57, which will be discussed in more detail below with reference to FIG. 23. The switch fabric module 34 is provided with a fast control plane 58 and one or more switches 59, and functions to switch data traffic between the transport interface modules 50, 52, 54 and 56 of the universal transport module 32.

It should be understood that the nodes 10 and/or 10a can be implemented in a variety of manners including those shown and discussed in U.S. Patent Application No. 20090245289 entitled "Programmable Time Division Multiplexed Switching" the entire content of which is hereby incorporated herein by reference.

Referring now to FIG. 3, shown therein is the mesh network 11 formed of multiple nodes 10-1, 10-2, and 10-3 in accordance with the present disclosure. The mesh network 11 can include more than three nodes, such three are shown for purposes of clarity. In particular, the nodes 10-1 and 10-2 are configured to communicate via a working connection (depicted in FIG. 3 as a "working LSP") along the communication link 20; while the nodes 10-1, 10-2, and 10-3 are also configured to communicate via a protecting connection (depicted in FIG. 3 as a "protecting LSP") via the communication links 60 and 62. The nodes 10-1, 10-2, and 10-3 may be connected via optical, wireless or electronic links For example, data traffic may flow from node-to-node over a series of optical links or optical fibers. Any two nodes 10-1, 10-2, and 10-3 may connect via multiple optical links. For bidirectional communication, for example, an optical link or fiber (commonly referred to as a "working connection") may be dedicated for data traffic transmitted in one direction, another optical link (also commonly referred to as a "working connection") may be dedicated for data traffic transmitted in the opposite direction, and yet another optical link (commonly referred to as a "protecting connection") may be used in case of a failure on a working connection. In practice, there may be N working connections and M protecting connections between any two of the nodes 10-1, 10-2, and 10-3, where $M<N$.

FIG. 3 outlines an exemplary operation environment for a WAKEUP protocol as discussed herein for activating, disabling, or preempting protecting connections using WAKEUP messages 100. The nodes 10-1, 10-2, and 10-3 are preferably adapted to setup and maintain connections through routing and signaling protocols of the shared-mesh protection GMPLS network. The WAKEUP messages 100 are generated and provided to the relevant nodes 10-1, 10-2, and 10-3 preferably using a protocol other than a routing and signaling protocol of the shared-mesh protection GMPLS network, such as an in-band communication or out-band communication for protecting connection activation by the universal transport module 32.

The nodes 10-1, 10-2, and 10-3 are also configured with a FCP (Fast Control Plane) 120 which is specially designed logic to handle link alarms indicative of failure of a working connection and perform WAKEUP messages 100 to activate protecting connections with high efficiency in accordance with the presently disclosed and claimed inventive concepts. The FCP 120 may be implemented on each input interface 12, output interface 14, and/or universal transport module 32 within the mesh network 11. The WAKEUP messages 100 can reach to the nodes 10-1, 10-2, and 10-3 in the mesh network 11 via in-band signaling, or out-band signaling.

1. In-Band Signaling and MPLS Labels

In the mesh network 11, an operator can deliver control and management messages through in-band channels, such as DCC in SONET/SDH, or GCC in OTN interfaces. DCC stands for Data Communications Channel and is a channel used to convey control and management information along the same optical path utilized for conveying user traffic. GCC stands for General Communication Channel and is also used to convey control and management information along the same optical path utilized for conveying user traffic). This is further described, for example, in reference [2]. In-band signaling utilizes the same channel that carries the data traffic, such as the protecting connection that is being activated in accordance with the present disclosure. The in-band channel bandwidth varies depending on network design, and is nevertheless sufficient for control traffic distribution.

In the remainder of this patent application, the in-band operation in the context of GCC channels for optical connections will be described by way of example, though the procedure and treatment would also apply in other similar transport networking scenarios.

Typically, at each intermediate node shown by way of example as the node 10-3 of FIG. 3, the in-band messages are delivered to a control plane 70 for extensive processing. The control plane 70 is a logical entity that can be implemented in a variety of manners, such as by the control module 16, or by the exchange control module 30 discussed above. However, for efficiency, it is possible to process some time-critical messages such as alarms and Wake-UP Messages 100, by circuitry within the input interface(s) 12 and/or the output interface(s) 14 directly. In other words, the input interface 12, and/or the output interface 14 and/or the universal transport module 32 may pick up and process control messages from in-band channels and deliver the control messages to other input interfaces 12 and/or output interfaces 14 and/or the switch fabric module 34 after processing. In accordance with the present disclosure, control messages on the control channel are processed by circuitry within the input interface(s) 12, and/or the output interface(s) 14 and/or the universal transport module 32 and then the control module 16 is notified of any actions taken. Circuitry could be analog and/or digital, components, or one or more suitably programmed microprocessors and associated hardware and software, or hardwired logic. Further, the input interface(s) 12 and/or the output interface(s) 14 retrieve information from the control module 16 regarding the protecting connections and the like for processing the control messages. By way of example, the input interfaces 12, and/or the output interfaces 14, and/or the universal transport module 32 will be described hereinafter as line modules for purposes of clarity. To implement shared-mesh restoration, each line module needs to keep track of the connections and associated network resources (e.g. time slots in a time-division multiplexing switching). Upon the reception of activation messages from in-band channels, the line modules can identify the protecting connections, and activate them accordingly.

Figure 8:
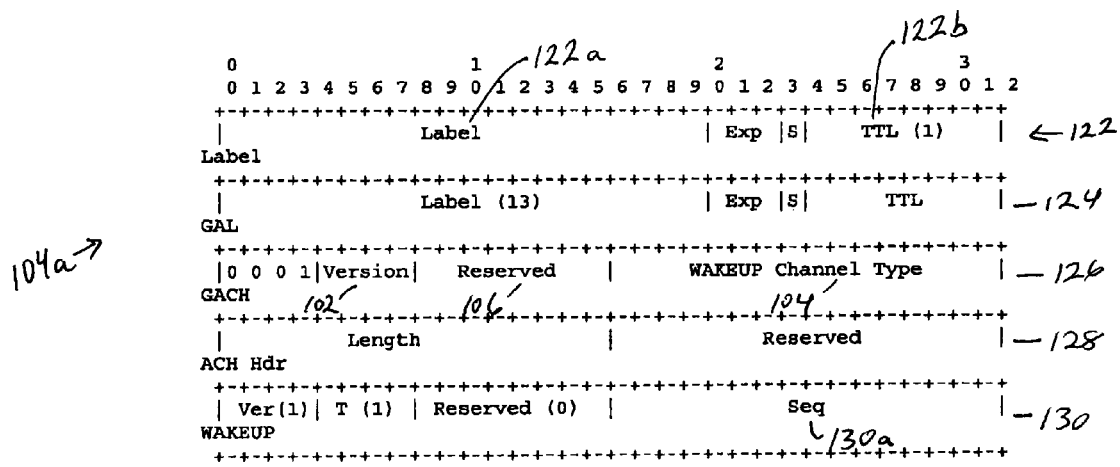
FIG. 8 is a schematic diagram of an exemplary in-band wake-up message utilizing a multiprotocol label switching-TP encapsulation protocol for enabling a protecting connection in accordance with the present disclosure.
Figure 9:
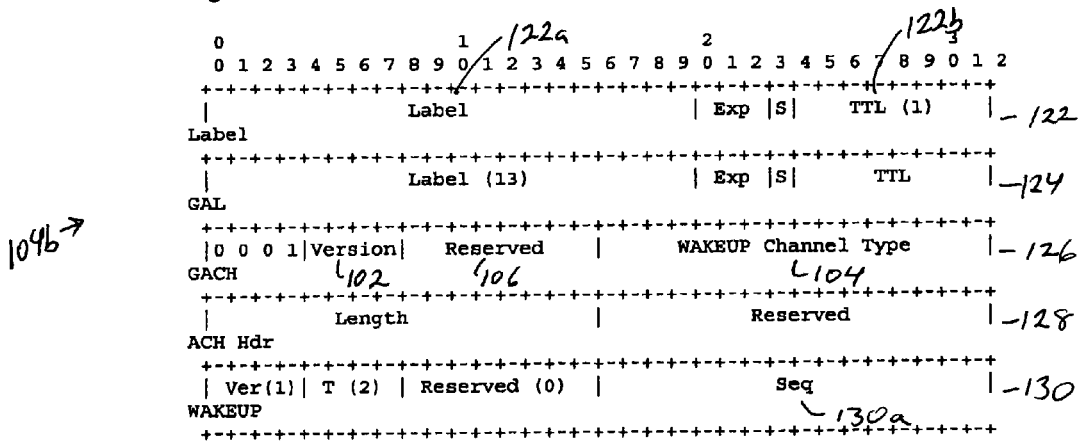
FIG. 9 is a schematic diagram of an exemplary in-band wake-up message utilizing multiprotocol label switching-TP encapsulation protocol for disabling a protecting connection in accordance with the present disclosure.

For efficiency, the nodes 10-1, 10-2, and 10-3 are configured to use MPLS labels 122a to identify the protecting connections, and label switching to deliver activation messages. This is shown in FIGS. 8 and 9.

Each connection can be identified and processed as a label switched path (LSP) by way of example. The label switched path is the path used by the activation message, and can be either the working connection or the protecting connection. See references [3] and [4] by way of example. By way of example, the control plane 70 can establish the bi-directional (upstream and downstream) LSP's inside the in-band channels. Each of the links shown in the drawings includes an underlying physical/optical connection, and the control messages between the nodes 10 or 10a are preferably transmitted using an in-band channel. Each LSP can preferably be activated using an in-band channel of the underlying physical/optical connection carrying user traffic.

At the network failure time, the input and output interfaces 12 and 14 can distribute MPLS labeled messages to activate, disable and preempt the protecting connections. This can essentially eliminate the interfacing and processing latency between the data path carrying user traffic and the control plane 70 during traffic protection, and yield a switch-over speed that is proportional to a message round-trip delay. For example, the message round-trip delay can be the time for a message to travel from node A to node D and from node D to node A.

Given the nature of the operation, the activation messages can be encapsulated with the MPLS-TP Generic Associated Channel Header (GACH) 126 (including the version field 102, the wakeup channel type field 104, and the reserved field 106,) as discussed in reference [5], for example.

Figure 4:
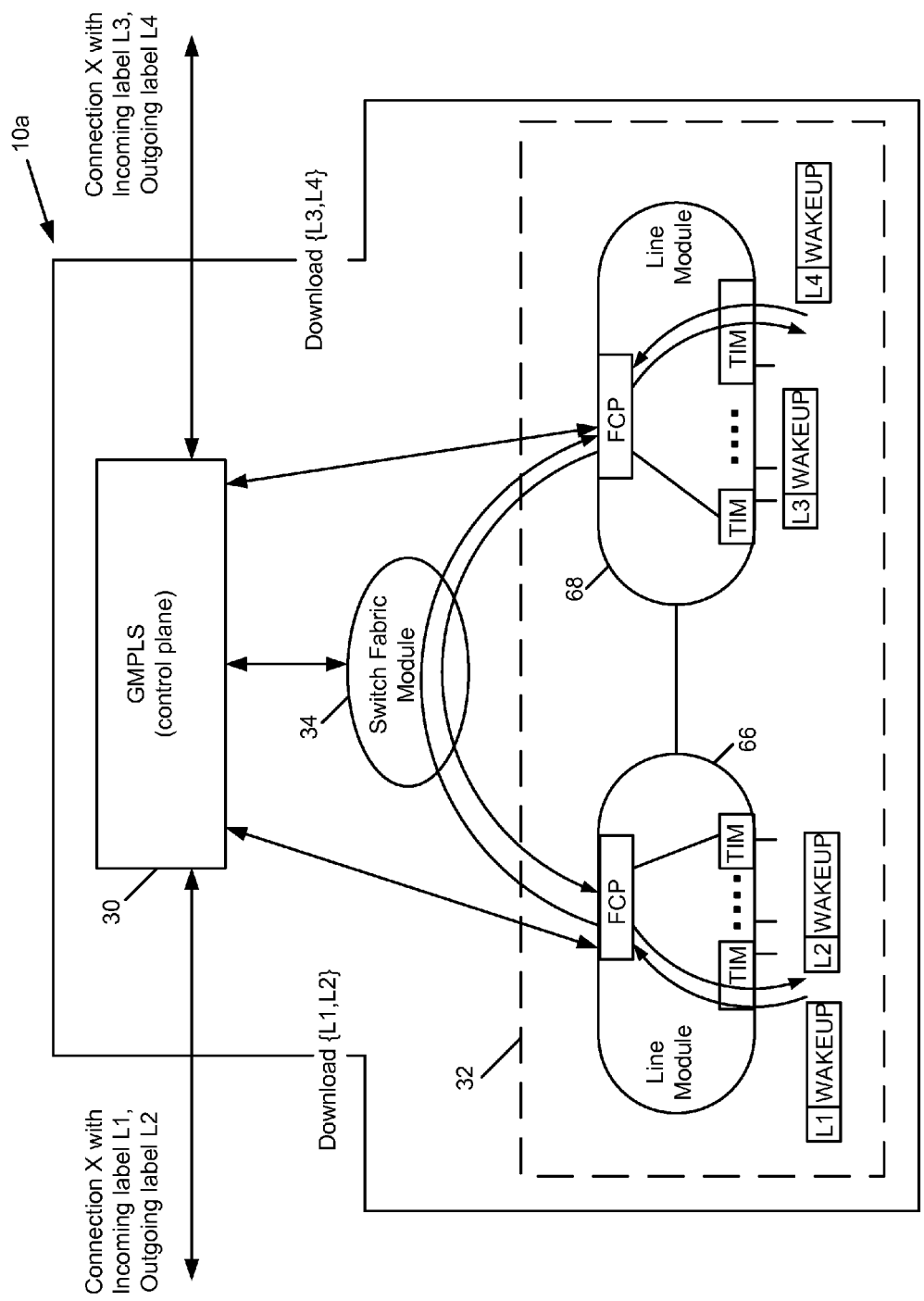
FIG. 4 is a block diagram of an embodiment of the node depicted in FIG. 2.

An example of an internal message is shown in FIG. 4. In the example of FIG. 4, the universal transport module 32 is implemented with an ingress line module 66, and an egress line module 68. At the control plane 70 running on the exchange control module 30, the GMPLS protocols will setup one or more working connections and one or more protecting connections during a negotiation. During the negotiation between the control planes 70 of the nodes 10 or 10a within the mesh network 11, labels shown as {L1, L2}, {L3, L4} by way of example are allocated for in-band signaling as part of the GMPLS processing. The labels {L1, L2}, {L3, L4} can be used for WAKEUP message 100 delivery on in-band channels. The control plane 70 downloads the labels to a FCP 120 on the ingress line module 66 and the egress line module 68. The WAKEUP messages 100 can be provided to the switch fabric module 34 with label L1 and L3, and transmit out with label L2 and L4, for example.

The ingress line module 66 and the egress line module 68 may include hardware components, or a combination of hardware and software components, that may provide network interface operations. Ingress line module 66 and/or the egress line module 68 may receive a multi-wavelength optical signal and/or transmit a multi-wavelength optical signal. A multi-wavelength optical signal may include a number of optical signals of different optical wavelengths. In one implementation, the ingress line module 66 and/or the egress line module 68 may perform retiming, reshaping, regeneration, time division multiplexing, and/or recoding services for each optical wavelength. The ingress line module 66 and the egress line module 68 may include circuitry. Circuitry could be analog and/or digital, components, or one or more suitably programmed microprocessors and associated hardware and software, or hardwired logic.

The switch fabric module 34 may include hardware components, or a combination of hardware and software components, that may provide switching functions to transfer data between the ingress line module 66 and the egress line module 68. In one implementation, the switch fabric module 34 may provide fully non-blocking transfer of data. As to be explained below, the switch fabric module 34 may be programmed to transfer data from a particular ingress line module 66 to a particular egress line module 68.

Exemplary components of a line module, such as the ingress line module 66 and/or the egress line module 68 are shown and described with reference to FIG. 3 of U.S. Patent Publication No. 20090245289, which disclosure is incorporated herein by reference. Exemplary components of the switch fabric module 34 are shown and described with reference to FIG. 6 of U.S. Patent Publication 20090245289, which disclosure is also incorporated herein by reference.

2. Out-Band IP Signaling

In certain scenarios, the operators may also choose to activate connections through an out-band IP network. An out-band IP network is not a part of the mesh network 11. In other words, out-band signaling does not use the data path carrying the user traffic, rather, it utilizes separate channels. An example of an out band IP signaling would be a DCN data communication network in Sonet.

In this case, since each headend node, i.e., the node 10-1 in FIG. 3, has the knowledge of all the relevant nodes 10-3 on a particular protecting connection from the Reservation Protocol (RSVP) Explicitly Route Object/Recording Routed Object (ERO/RRO) objects, the headend node 10-1 can initiate point-to-point IP messages to the node 10-3 simultaneously for quick activation.

For instance, it is possible that activation messages for a particular connection may be delivered and processed in both in-band and/or out-band. One or multiple nodes 10 or 10a on the connection may rely on in-band signaling, while some others use out-band signaling. In other words, for compatibility purposes, if a node does not support in-band signaling, then such nodes can be activated using out-band signaling. In this document, we will focus more on in-band signaling, and treat the out-band signaling as special cases.

3. Operation Outline

Figure 5:
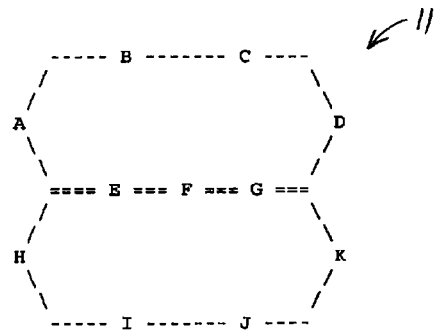
FIG. 5 is a block diagram of an exemplary mesh network formed of multiple nodes illustrating multiple working connections and multiple protecting connections in accordance with the present disclosure.

Throughout the remainder of this description, the operation of the nodes 10 or 10a to form the mesh network 11 depicted in FIG. 5 will be described. In FIG. 5, the nodes 10 and/or 10a are provided with alphabetic designations A, B, C, D, E, F, G, H, I, J and K. In this example, the mesh network 11 includes headend nodes A and H; tailend nodes D and K; and intermediate nodes B, C, E, F, G, I and J. The mesh network 11 also includes two working connections which are shown by the single dashed lines; and two protecting connections that are shown by the double dashed lines. Thus, the working connections are formed by the nodes {A, B, C, D}, {H, I, J, K}; and the protecting connections are formed by the nodes {A, E, F, G, D}, and {H, E, F, G, K}.

In this example, the links between E, F and G are shared by both protecting connections. The working and protecting connections are established by the nodes A-K using GMPLS protocols prior to any network failure.

Shared-mesh restoration, as used herein refers to a situation in which the operator(s) from the headend node A and/or H signal one or multiple protecting connections for a particular working connection. Each protecting connection reserves the timeslots on the intermediate nodes B, C, E, F, G, I and/or J, but does not actually configure them. The timing slots may be shared by multiple protecting connections. Upon network failure, the headend node A and/or H triggers explicit activation messages to activate one of the protecting connections. The intermediate nodes E, F and/or G will configure the timeslots, and the headend node A and/or H will switch the user traffic over to the new working connection upon the completion of the activation sequences. Each protecting connection is likely established over a set of nodes that are shared by multiple other working and/or protecting connections.

Upon the detection of a working connection failure, the headend nodes, A and H or the tailend nodes D and K may trigger the WAKEUP protocol messages 100 to activate the protecting connections, and redirect user traffic immediately after.

The GMPLs protocols establish a consistent definition of priority levels among the connections throughout the network. At WAKEUP processing time, each of the nodes A-K will rely on the priority levels to potentially preempt other connections.

Preemption as referred to herein is a reallocation of network resources where an intermediate node B, C, E, F, G, I and J can no longer participate in an existing protecting connection. During preemption, if a node can find spare resources (e.g., time slots in a time-division multiplexing switching system), the network transport node may accept an activation request and re-negotiate with the neighboring nodes with the newly allocated resources. This process is called "local resource reallocation".

When a protecting connection is preempted on one of the intermediate nodes B, C, E, F, G, I and J, the intermediate node B, C, E, F, G, I and/or J is responsible for notifying the headend node A or H and the tailend node D or K on protecting connection changes immediately, and interfacing with the control plane 70 to confirm resource changes.

As soon as the headend nodes A and/or H detect connection preemption on a particular intermediate node B, C, E, F, G, I and/or J, the headend nodes A and/or H inform all relevant intermediate nodes B, C, E, F, G, I and/or J in the protecting connection to free the resources.

Upon the detection of failure on a working connection, both headend and tailend nodes A, D, H and K may initiate one or more activation message independent of each other. This may expedite the activation time. Similarly, both headend and tailend nodes A, D, H and K may initiate a de-activation process or signal independent of each other in response to applications such as traffic reversion.

To optimize traffic protection and resource management, the headend nodes A and/or H may poll the intermediate nodes B, C, E, F, G, I and J in the protecting connections about resource availability. The intermediate nodes B, C, E, F, G, I and/or J are responsible for informing the current resource utilization.

Inversely, when a set of network resources becomes unavailable (due to preemption or network failure), the adjacent intermediate nodes B, C, E, F, G, I and/or J need to notify all the relevant headend/tailend nodes A, D, H and K of resource changes on the protecting connections.

As mentioned before, each in-band WAKEUP message 100 is preferably encapsulated with a MPLS header 122 and transmitted over the in-band channels of a link. Each in-band WAKEUP message 100 also preferably includes the MPLS labels 122a uniquely identify the underlying protecting connections. Using circuitry within the line modules 66 and/or 68, the MPLS label 122a can be swapped and preferably needs to be swapped before forwarding to the next hop.

For out-band signaling, each WAKEUP message 100 can be routed to a destination intermediate node B, C, E, F, G, I and/or J. Based on the connection identification carried in each message, the destination intermediate node B, C, E, F, G, I and/or J will perform the requested action.

Protocol Definition—WAKEUP Messages

In a preferred embodiment, the WAKEUP protocol defines the following WAKEUP messages 100, an ENABLE message 104a, a DISABLE message 104b, a GET message 104c, a STATUS message 104d, and a NOTIFY message 104e which are initiated and/or processed by the line module(s) 66 and/or 68 of the nodes A-K. The ENABLE message 104a is initiated by the line module(s) 66 and/or 68 (depicted in FIG. 4) of the headend/tailend nodes A, D, H and/or K to activate a protecting connection for establishing a working connection. The ENABLE message 104a is one example of the activation message described herein, although the activation message may take other forms so long as the activation message functions to activate a protecting connection for establishing a working connection. The DISABLE message 104b is initiated by the line module(s) 66 and/or 68 of the headend/tailend nodes A, D, H and/or K to disable a protecting connection and free the associated network resources. The GET message 104c is initiated by the line module(s) 66 and/or 68 of the headend/tailend nodes A, D, H and/or K to gather resource availability information on a particular protecting connection. The NOTIFY message 104e is initiated by the line module(s) 66 and/or 68 of the intermediate nodes and terminate on the line module(s) 66 and/or 68 of the headend/tailend nodes A, D, H, and/or K to report preemption or network failure conditions. The STATUS message 104d is an acknowledgement for the ENABLE message 104a, the DISABLE message 104b, the GET message 104c, and the NOTIFY message 104e, and contains relevant status information.

The ENABLE message 104a, the DISABLE message 104b, the NOTIFY message 104e and the STATUS message 104d are utilized in the preferred embodiments. The GET message 104c is an advanced feature.

Figure 6:
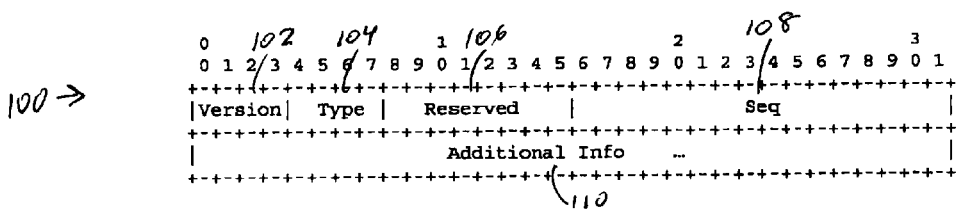
FIG. 6 is a schematic diagram of an exemplary wake-up message in accordance with embodiments of the present disclosure.

FIG. 6 is a schematic diagram of an exemplary WAKEUP message 100 in accordance with embodiments of the present disclosure. Each WAKEUP message 100 preferably has the following data:

Version: 1
Type:
  ENABLE 1
  DISABLE 2
  GET 3
  STATUS 4
  NOTIFY 5
Reserved field 106 for future functions such as span protection.
Seq field 108 uniquely identifies a particular message and is defined to support reliable message delivery.
Additional Info field 110 including the message-specific data.

Reliable Messaging

The messaging is preferably a two-way query-response operation (request and acknowledgement) as described below although other manners of messaging can be used, such as a three-way query response including (1) a request, (2) acknowledgement and (3) acknowledgement to the acknowledgement. In this example, each node A-K maintains a sequence number generator (which can be implemented as logical counting functionality), and each new sending message will have a new sequence number. After sending a message, the node A-K will wait for a response with the same sequence number.

Specifically, upon the generation of the ENABLE message 104a, the DISABLE message 104b, the GET message 104c, and the NOTIFY message 104e, the transport switch node A-K that is the message sender expects to receive the STATUS message 104d in reply with the same sequence number.

If the transport switch node A-K that sent a message does not receive the STATUS message 104d within a time interval, the transport switch node A-K will retransmit the same message with a new sequence number, and start to wait again. After multiple retries (by default, 3 for example), the transport switch node A-K that send the message will declare the destination as unreachable, and notify an operator for further service. The time intervals can vary, and in(Ping—what are typical time intervals? an optical network the time interval could be approximately 50 milliseconds, for example. The time interval can be changed depending upon the technology utilized).

MPLS-TP Encapsulation for In-Band Messages

Figure 7:
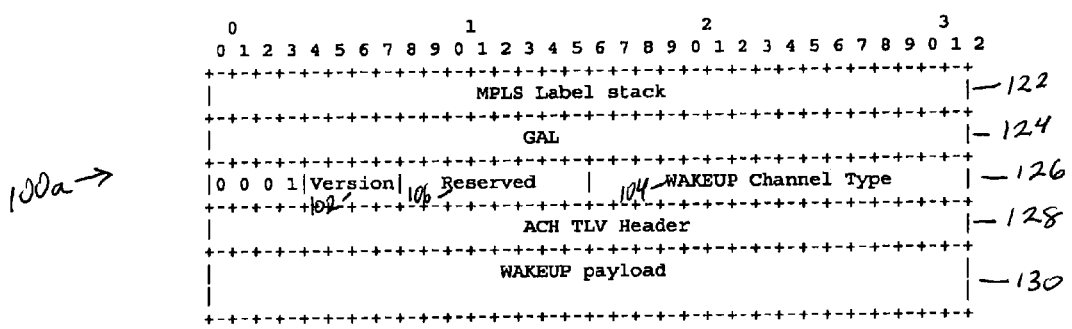
FIG. 7 is a schematic diagram of an exemplary in-band wake-up message utilizing a multiprotocol label switching-TP encapsulation protocol.

As mentioned before, the WAKEUP messages 100 preferably use MPLS labels 122a to identify the protecting connections over a link when delivered in-band. Further, the WAKEUP messages 100 can be encoded according the MPLS protocol which is described, for example, in reference [5]. FIG. 7 shows an exemplary format of the WAKEUP messages 100.

The exemplary format depicted in FIG. 7 includes a MPLS label stack field 122, a GAL field 124, a Version field 102, a Reserved field 106, a Wakeup channel type field 104, an ACH TLV header field 128 and a Wakeup payload field 130. The MPLS label stack field 122, reserved field 106 and version field 102 have been described above.

An exemplary value for the GAL field 124 can be the numeral 13 as described in reference [5], for example. The WAKEUP Channel Type 104 includes a unique identification number, such as the GACH channel number assigned to the protocol. An exemplary ACH TLV Header 128 contains the message length, and is described, for example In reference [5]. ACH TLV stands for Associated Channel Header/Type Length Value.

For in-band signaling, the WAKEUP messages 100 may be initiated from the headend and/or tailend nodes A, D, H and/or K, delivered through the in-band channels, and processed on a hop-by-hop basis by the intermediate nodes B, C, E, F, G, I and/or J and the tailend nodes D and/or K. As illustrated below, the headend node A sends WAKEUP messages 100 from node A toward the tailend node D traversing intermediate nodes E, F and G in sequence.

In-Band Message Processing

To enable a protecting connection, the ENABLE message 104a is transmitted by the headend and/or the tailend nodes A, D, H and K as follows. An exemplary ENABLE message 104a is depicted in FIG. 8. In the ENABLE message 104a, the MPLS label 122a is learned from Label object in RESV (or Upstream Label in PATH, if initiated from tailend). In the preferred embodiment, ENABLE messages 104a always use a MPLS TTL 122b of one (1) to force a hop-by-hop process. Upon reception, a next-hop node, such as the intermediate nodes B, C, E, F, G, I and/or J will search for a corresponding connection from the MPLS label 122a, and then try to activate the protecting connection. If successful, the next-hop node will forward the ENABLE message 104a to the next hop by swapping the MPLS label 122a to an out-going label. Otherwise, the next-hop node will reply with the STATUS message 104d including error information back to the headend node A or H.

When the ENABLE message 104a reaches the tailend node D or K, in a preferred embodiment the tailend node D or K must reply by sending a STATUS message 104d to the headend node A or H.

In the preferred embodiment, the headend node A or H will declare the success of the activation only when it gets a positive reply from the tailend node D or K. If the headend node A or H does not receive a positive reply within a time interval, the headend node A or H will retransmit another ENABLE message 104a with a different Seq number.

If the headend node A or H receives the STATUS message 104d indicating an error, or not receiving any acknowledgement after multiple tries, the headend node A or H will initiate DISABLE messages 104b to clean up network resources on all the relevant intermediate nodes B, C, E, F, G, I and/or J on the protecting connection.

It is possible that the intermediate nodes B, C, E, F, G, I and/or J may receive additional ENABLE messages 104a after activation, due to retransmission by a headend or tailend node A, D, H or K and bi-directional activation. The intermediate nodes B, C, E, F, G, I and/or J need to forward the message regardless.

The intermediate nodes B, C, E, F, G, I and/or J may receive multiple ENABLE messages 104a at the same time. In the preferred embodiment, the intermediate nodes B, C, E, F, G, I and/or J receiving the multiple ENABLE messages 104a will always process the one with the highest sequence number. Of course, the implementation needs to take sequence number wrapping around into consideration using logic operating upon the intermediate nodes B, C, E, F, G, I and/or J receiving the multiple ENABLE messages 104a.

To improve the speed of processing, since all protecting connections have been provisioned prior to activation, upon reception, the intermediate nodes B, C, E, F, G, I and/or J can run an admission check and forward the messages downstream as soon as possible. There is no need to wait for the actual connection setup before forwarding the ENABLE messages 104a. Note that, at the headend node A and/or H, in the preferred embodiment each connection requires one timer for message retransmission. The timer can be implemented in a variety of manners, such as a countdown timer. The values for the timer can be in microseconds and/or milliseconds.

Disable a Protecting Connection

To disable a protecting connection, the headend nodes A and/or H transmit the DISABLE message 104b to the intermediate nodes B, C, E, F, G, I and/or J of the protecting connection. An exemplary DISABLE message is shown in FIG. 9. The DISABLE message 104b has an MPLS label 122a, and an MPLS TTL 122b. The MPLS label 122a represents the protecting connection to be de-activated. The MPLS TTL 122b is set to 1 to force hop-by-hop processing. Upon reception, the intermediate node B, C, E, F, G, I and/or J will de-activate the protecting connection, by freeing the resources (e.g., time-slots) from the data-plane.

In the preferred embodiment, the DISABLE message 104b must traverse through and be processed on all the intermediate nodes B, C, E, F, G, I and/or J of the corresponding protecting connection. In response to receiving the DISABLE message 104b, the tailend node D or K replies with a STATUS message 104d to the headend node A or H.

In general, the de-activation process is complete when the headend node A or H receives the corresponding STATUS message 104d from the tailend node D or K.

Get Protecting Connection Status

Figure 10:
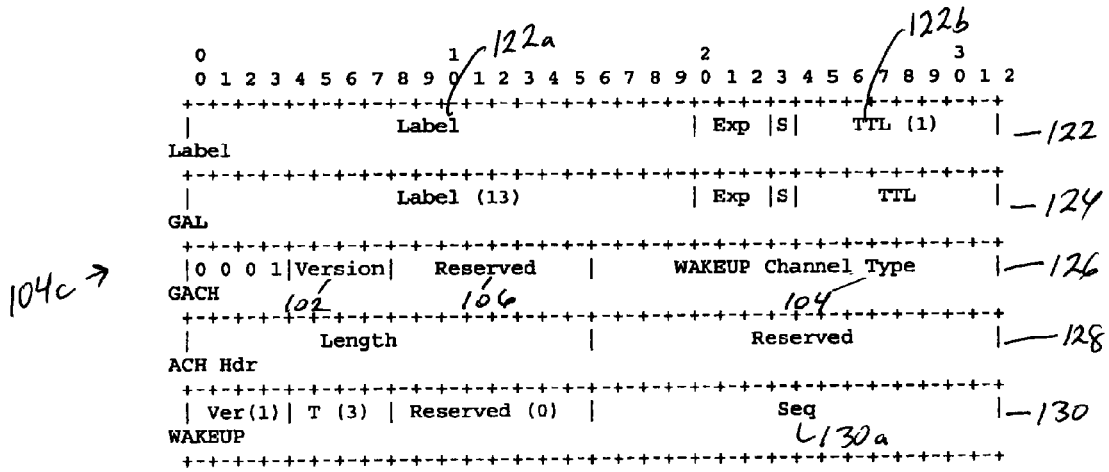
FIG. 10 is a schematic diagram of an exemplary in-band wake-up message utilizing multiprotocol label switching-TP encapsulation protocol for getting a protecting connection status in accordance with the present disclosure.

An exemplary GET message 104c for getting a protecting connection status is depicted in FIG. 10. The GET message 104c is mainly used by the operators to check resource availability on a particular connection. The process procedure on each node A-K is very similar to that of ENABLE messages 104a, except that a connection should not be activated or de-activated.

The node A-K, upon reception of a GET message 104c, will check the availability of resources. If the resource is no longer available, the node A-K will reply with the STATUS message 104d indicating error conditions. Otherwise, the node A-K will relay the GET message 104c to the next hop.

In the preferred embodiment, the tailend node D and/or K is required to reply to a STATUS message 104d by reporting the findings to the headend node A and/or H that initiated the GET message 104c.

Figure 11:
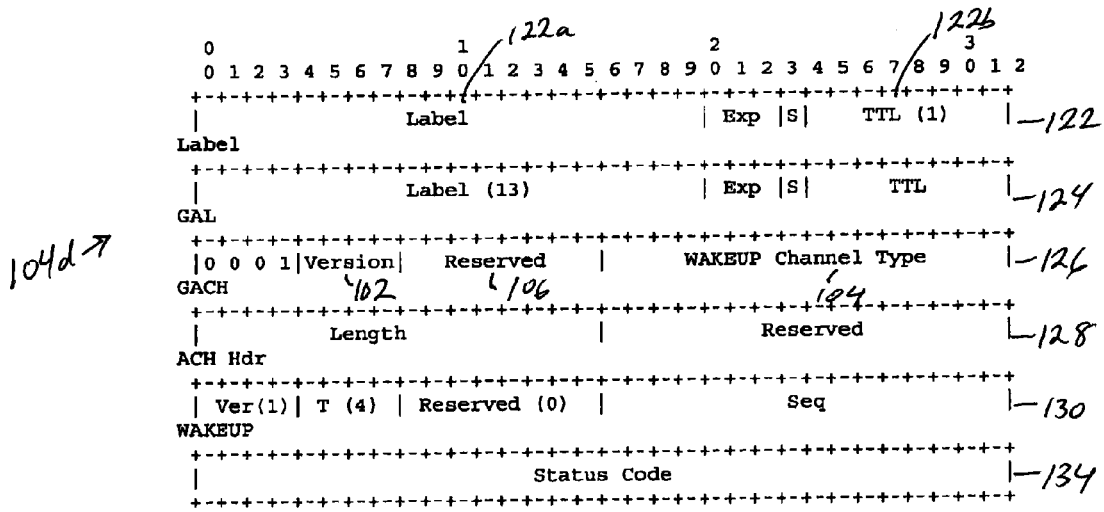
FIG. 11 is a schematic diagram of an exemplary in-band wake-up message utilizing multiprotocol label switching-TP encapsulation protocol for providing an acknowledgment and/or status of an activation condition.

An exemplary STATUS or acknowledgement message 104d is depicted in FIG. 11. Note that the acknowledgement messages include a Status Code field number describing the activation condition. Some of the conditions can be:

| | |
|---|---|
| 100 | OK |
| 2xx | Processing Error |
| 201 | no such connection |
| 202 | bad/unknown message |
| 3xx | Network Issue |
| 301 | No more resource |
| 302 | Preempted |
| 303 | out-going module is no longer operational |
| 4xx | Informative data |
| 401 | Shared resource has been taken |
| 402 | Bi-direction activation has taken place |

The STATUS message 104d can be the acknowledgement packet to all messages, and may be generated by any node A-K in the mesh network 11. Since the connections are preferably managed as bi-directional LSP's between in-band nodes, the STATUS messages 104d can use a label which is pointing to the reverse direction typically toward the headend of the message that it is acknowledging.

In the preferred embodiment, each STATUS message 104d uses a same sequence number as the corresponding message (ENABLE, DISABLE, GET, and NOTIFY).

When replying to the headend/tailend nodes A, D, H and/or K, the intermediate nodes B, C, E, F, G, I and/or J preferably originate STATUS messages 104d will a large MPLS TTL 122b value (0xff, by default). Thus, a node A-K will typically process a STATUS message 104d on the following conditions: (a) TTL=0, and/or (b) the node A-K is the headend node A or H; or the tailend node D or K for the protecting connection. In all other cases, the intermediate nodes B, C, E, F, G, I and/or J should forward the messages as fast as possible.

Notification on Connection State Changes

Figure 12:
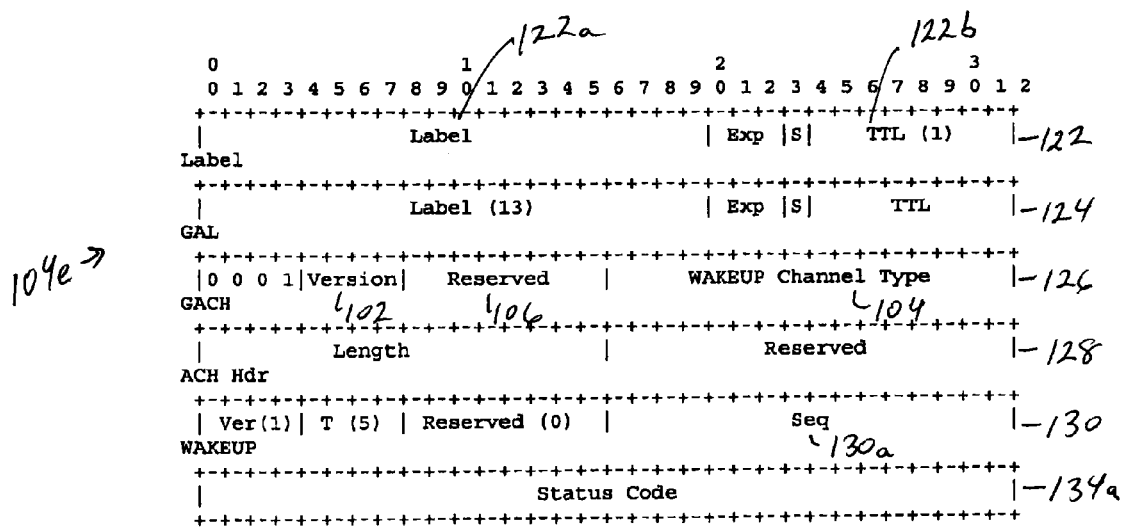
FIG. 12 is a schematic diagram of an exemplary in-band wake-up message utilizing multiprotocol label switching-TP encapsulation protocol for providing a notification message generated by an intermediate node to report the connection state changes to headend/tail end nodes.

An exemplary NOTIFY message 104e is shown in FIG. 12 and preferably has a similar message format and encoding as the exemplary STATUS message 104d. Similarly to the STATUS message 104d, the NOTIFY message 104e preferably includes a STATUS-CODE 134a. In general, the NOTIFY messages 104e are generated by the intermediate nodes B, C, E, F, G, I and/or J to report any changes in a state of the protecting connection to the headend/tailend nodes A, D, H and/or K. In the preferred embodiment, the intermediate node B, C, E, F, G, I and/or J sending the NOTIFY message 104e is always expecting the STATUS message 104d in reply and an absence of which will trigger NOTIFY message 104e retransmission.

To deliver the STATUS messages 104d back to the intermediate node B, C, E, F, G, I and/or J sending the NOTIFY message 104e, the preferred embodiment requires the nodes A-K to have a consistent initial MPLS TTL 122b value in the NOTIFY messages 104e. By default, all NOTIFY messages 104e have an initial MPLS TTL 122b of 0xFF. On receipt, the headend/tailend nodes A, D, H and/or K will recover a hop count by subtracting the MPLS TTL 122b value in a received message from this default value, and then copying the result to the corresponding reply (STATUS) message 104d. The intermediate nodes B, C, E, F, G, I and/or J preferably forward the NOTIFY messages 104e as fast as possible.

Out-Band Message Processing

Out-band WAKEUP message 100 processing is very similar to that of in-band. The WAKEUP message 100 format can be identical, and the following are the main differences:

1. There is no MPLS headers 122 and associating label 122a processing.

2. Each out-band message preferably carries a Connection-ID that uniquely identifies a protecting connection in the mesh network 11. The Connection-ID may use the connection identification information as specified in RSVP SESSION and SENDER_TEMPLATE objects, which would result in a 12-byte address.

3. The headend node A or H; and/or the tailend node D or K will use the Connection-ID to find the corresponding protecting connection for activation etc.

Security Consideration

The protecting connection activation takes place in a controlled networking environment. Nevertheless, it is expected that the edge nodes will encapsulate and transport external traffic into separated tunnels, and the intermediate nodes B, C, E, F, G, I and/or J will never have to process them.

Operation Examples

Figure 13:
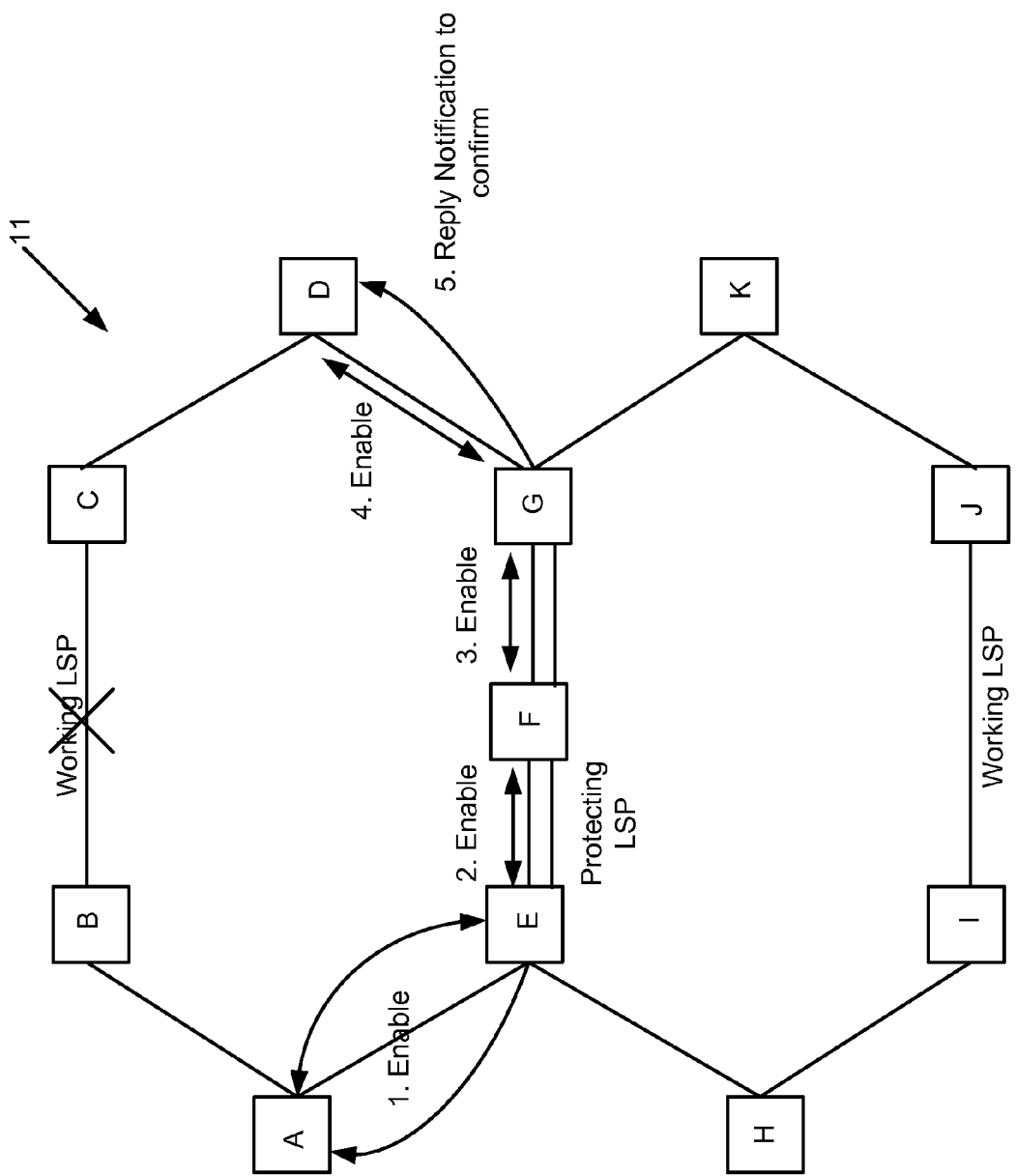
FIG. 13 is a block diagram of an exemplary mesh network formed of multiple nodes illustrating a protecting connection activation sequence.
Figure 14:
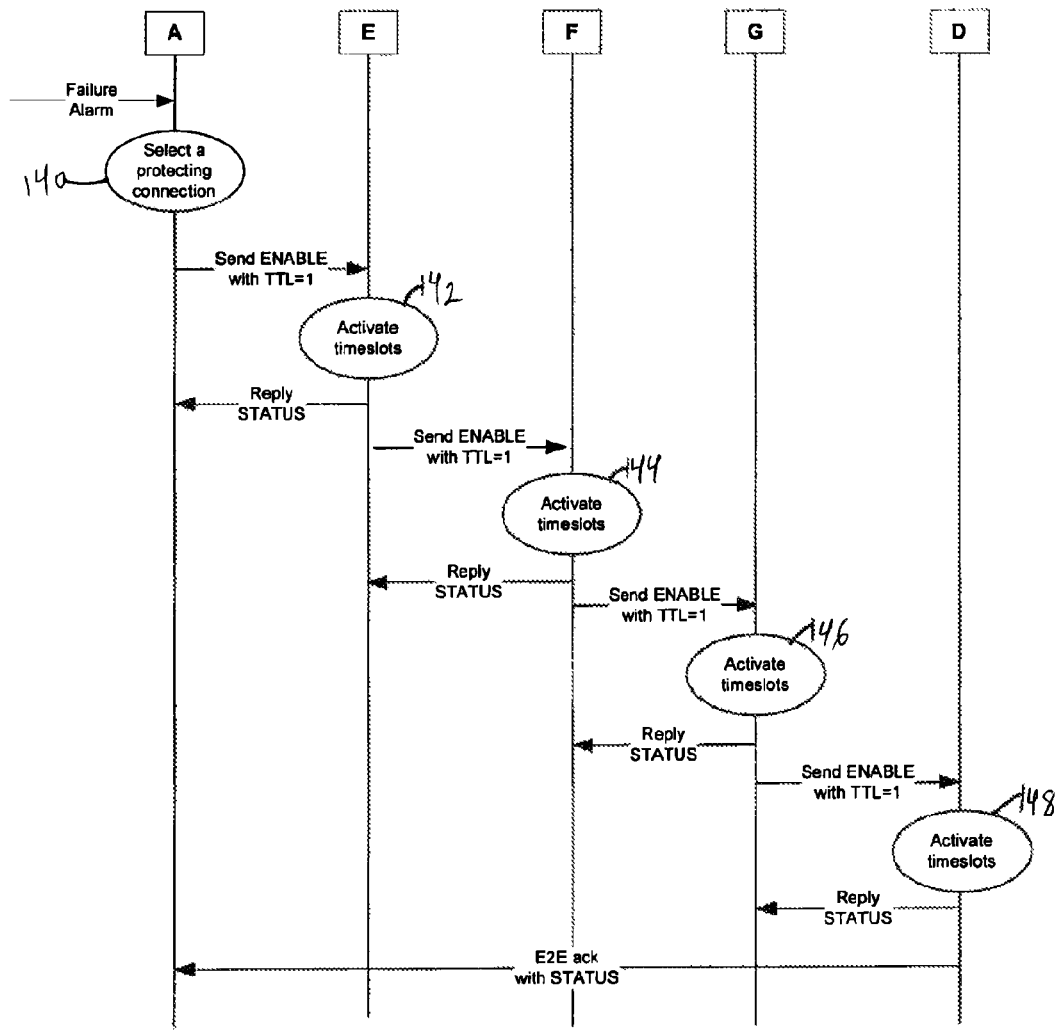
FIG. 14 is a timing diagram illustrating the protecting connection activation sequence depicted in FIG. 14.

In this section, the generation and delivery of the WAKEUP messages 100 among the nodes A-K is discussed. For clarity, the protocol disclosed herein for generating and delivering the WAKEUP messages 100 is discussed in view of the following events:

Protecting connection activation
Messaging over lossy links
De-activation and cleanup procedure
Query and diagnostics
Preemption procedure Activating a Protecting Connection Shown in FIGS. 13 and 14 are diagrams of an exemplary protecting connection activation sequence. In particular, FIG. 13 illustrates the mesh network 11 formed of multiple nodes A-K involved in the protecting connection activation sequence, while FIG. 14 is a timing diagram thereof.

1. As shown in FIG. 13, the working connection between intermediate nodes B and C fails and triggers a failure alarm. Upon receiving a failure alarm or detecting the failure, the FCP 120 on headend node A selects a protecting connection as indicated at block 140, and then initiates an ENABLE message 104a immediately to a first node intermediate node in the protecting connection (i.e., node E) as indicated by numeral 1. The intermediate node E activates the timeslots (as indicated by the block 142 in FIG. 14) and then replies to headend node A as shown in FIG. 14, and then transmits an ENABLE message 104a to the next hop, i.e., intermediate node F as indicated by the numeral 2 in FIG. 13. This sequence continues as indicated by the numerals 3 and 4 in FIG. 13, and blocks 144, 146, and 148 in FIG. 14, until the tailend node D receives an ENABLE message 104a and transmits an acknowledgement message as indicated by a numeral 5 in FIG. 13, as well as depicted in FIG. 14.

2. MPLS label management: The FCP 120 of each of the nodes A, E, F, G and D encodes the WAKEUP messages 100 with an MPLS label 122a provided by the control plane 70. The MPLS label 122a is changed at each hop as discussed above with reference to FIG. 5. On the intermediate nodes E, F and G, each connection can be associated with four labels:

1) L2 Receive label on Ingress is a label (in LABEL object) for a message sent by the intermediate nodes E, F, and G, toward the headend node A and/or H, i.e., upstream, in RSVP-TE Resv messages. An exemplary Receive label on Ingress label is depicted as label "L2" in FIG. 4.

2) Transmit label on Ingress is a label (in UPSTREAM_LABEL object) received from a node E, F or G which is closer to the headend nodes A and/or H, i.e., upstream, in RSVP Path messages. For example, the node F uses this label to communicate with the node E that is upstream on a particular protecting connection. An exemplary Transmit label on Ingress is depicted as label "L1" in FIG. 4.

3) Receive label on Egress is a label (in UPSTREAM_LABEL object) sent by one of the nodes E, F or G toward another node that is downstream, i.e., closer to the tailend node D or K in RSVP Path messages. An exemplary Receive label on Egress is depicted as label "L4" in FIG. 4.

4) L3 Transmit label on Egress is a label (in LABEL object) received by one of the nodes E, F or G from downstream in RSVP-TE Resv messages. The nodes E, F or G use this label to communicate with one of the nodes E, F or G that is downstream on a particular protecting connection. An exemplary Transmit label on Egress is depicted as "L3" in FIG. 4.

3. The nodes A-K use the TTL field 122b in the MPLS header 122 to control how far the message would traverse. Exemplary processing rules are:

1) On receive, if the message has TTL=0, the node A-K can drop the packet without further processing.

2) If the headend node A or H or the tailend node D or K of the protecting connection receives the message, such message can be processed locally by the headend node A or H or the tailend node D or K. In a preferred embodiment, the headend and/or tailend nodes A, H, D and/or K processes all received control messages.

3) The node A-K can always decrement the TTL value 122b by one (1). If TTL=0 after the decrement, the node A-K preferably processes the message. Otherwise, the node will forward the message without further processing (unless, of course, the node is not a headend or tailend).

4) On transmission, the node A, E, F, G and/or D will adjust the TTL value. For hop-by-hop messages, TTL=1. For end-to-end, TTL=0xFF, by default.

4. Hop-by-hop acknowledgement: As shown in FIG. 14, every ENABLE message 104a is preferably acknowledged at each hop, i.e., each node A, E, F, G and/or D. This allows the data traffic to follow the ENABLE messages 104a for speedy traffic recovery: that is, as soon as there is an acknowledgement from the downstream hop, e.g., node F, relative to node E, the timeslot can be programmed to switch the traffic. This operation can potentially improve the switch-over speed dramatically.

5. End-to-end acknowledgement: As shown in FIG. 14 and indicated by the numeral 5, there can be an end-to-end acknowledgement from the tailend node D to the headend node A. The headend node A can withdraw from the activation operation if the hop-by-hop processing takes too long. This is possible if one particular link is congested, which causes ENABLE messages 104a to be dropped. At the headend node A, each working connection may be protected by multiple protecting connections. If one protecting connection is responding too slowly, the headend node A needs to switch to the alternative protecting connection quickly.

Reliable Messaging

Figure 15:
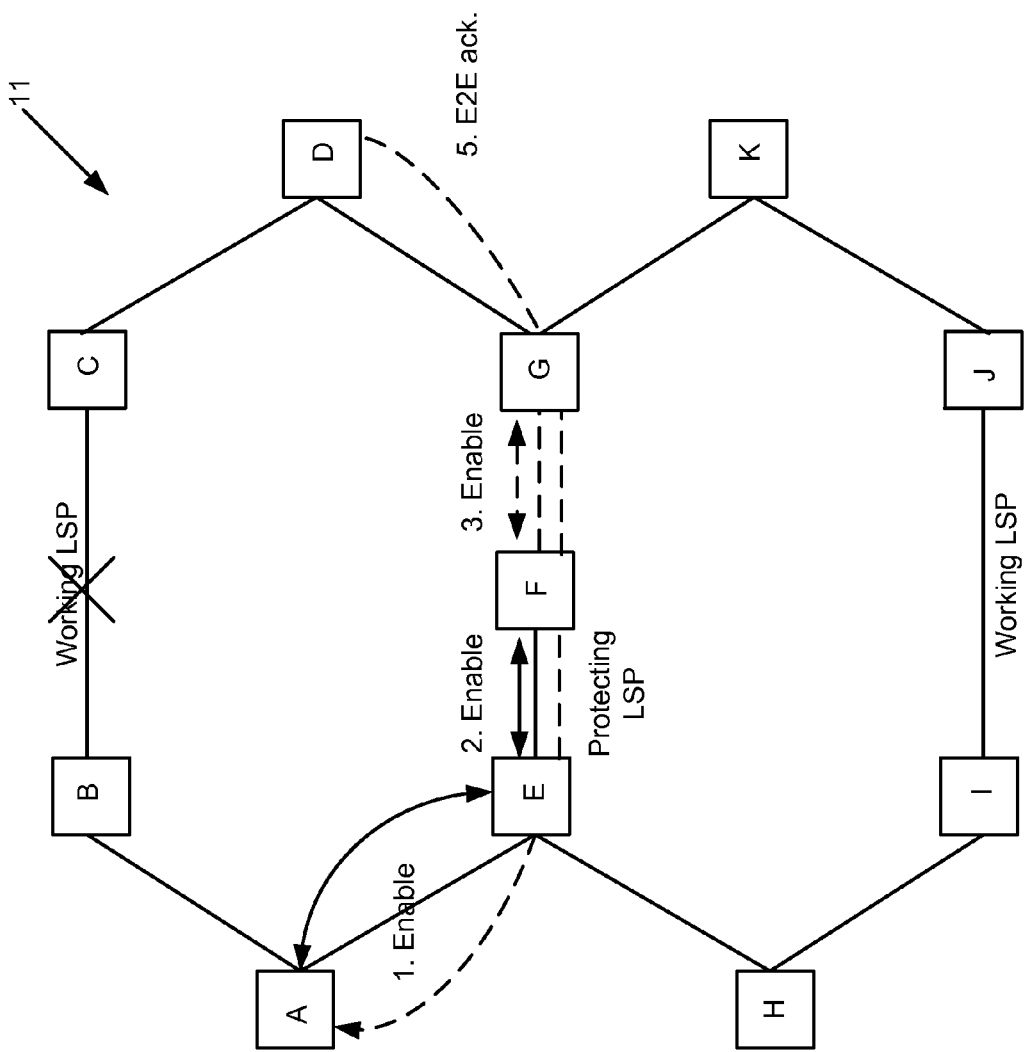
FIG. 15 is a block diagram of an exemplary mesh network formed of multiple nodes illustrating an exemplary failed protecting connection activation sequence.
Figure 16:
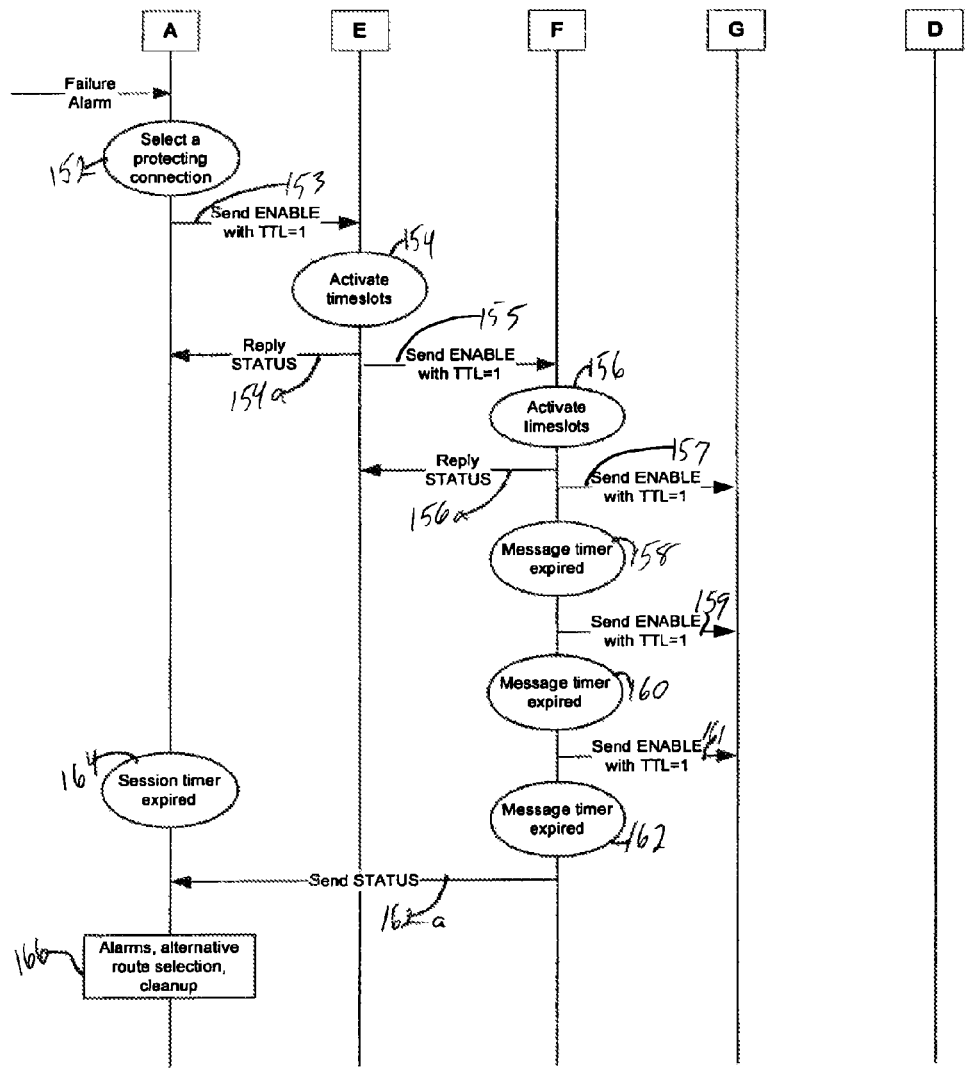
FIG. 16 is a timing diagram illustrating the exemplary failed protecting connection activation sequence.

FIGS. 15 and 16 illustrate an example where the protecting connection activation sequence failed, i.e., where one GCC segment in the protecting connection is not functional. In particular, the connection between nodes F and G has failed and so the activation sequence is not successful.

As shown in FIG. 16, the headend nodes, i.e., Node A and H will maintain a session timer for activation, deactivation and query actions. The headend node A selects a protecting connection as shown by way of the block 152 in FIG. 16, and then sends the ENABLE message 104a with a TTL=1 (as indicated by numeral 1 in FIG. 15 and reference numeral 153 in FIG. 16), to a first node in the protecting connection, which in the example depicted in FIGS. 15 and 16 is the intermediate node E. The intermediate node E activates one or more timeslots of the protecting connection as indicated by a block 154 in FIG. 16, and then replies with the STATUS message 104d, as indicated by the reference numeral 154a in FIG. 16. The intermediate node E then transmits the ENABLE message 104a to the intermediate node F, as indicated by the reference numeral 155 in FIG. 16 and numeral 2 in FIG. 15. The intermediate node F then activates the timeslots in the protecting connection, as indicated by the block 156 in FIG. 16, and then transmits the STATUS message 104d to the intermediate node E, as indicated by the reference numeral 156a in FIG. 16. The intermediate node F also transmits the ENABLE message 104a to the intermediate node G (as indicated by numeral 3 in FIG. 15, and reference numerals 157, 159 and 161 in FIG. 16), however such is not received by the intermediate node G, due to the failure of the link between the intermediate nodes F and G.

Upon the reception of the ENABLE message 104a, the DISABLE message 104b and the GET message 104c, in the preferred embodiment the tailend nodes D and/or K must send back a STATUS message 104d (status=101). If there is no acknowledgment within the session timer interval, the session timer expires as shown in step 164, the headend nodes A and/or H will raise alarms, activate alternative protecting connections, and cleanup the unsuccessful activation attempt in step 166 of FIG. 16.

The intermediate nodes, i.e., nodes E, F and G maintain a message timer for each message. Thus, for example, if intermediate node F cannot reach intermediate node G after multiple retries (steps 157, 159 and 161 in FIG. 16), intermediate node F will inform the headend node A with the STATUS message 104*d* (status=203) (step 162*a*). In the preferred embodiment, each STATUS message 104*d* has MPLS TTL 122*b* of 0xFF.

De-Activating a Protecting Connection

Deactivation is through the transmission and processing of DISABLE messages 104*b* from the headend nodes A and/or H. An exemplary deactivation sequence is depicted in FIGS. 17 and 18 for deactivating a protecting connection.

Figure 17:
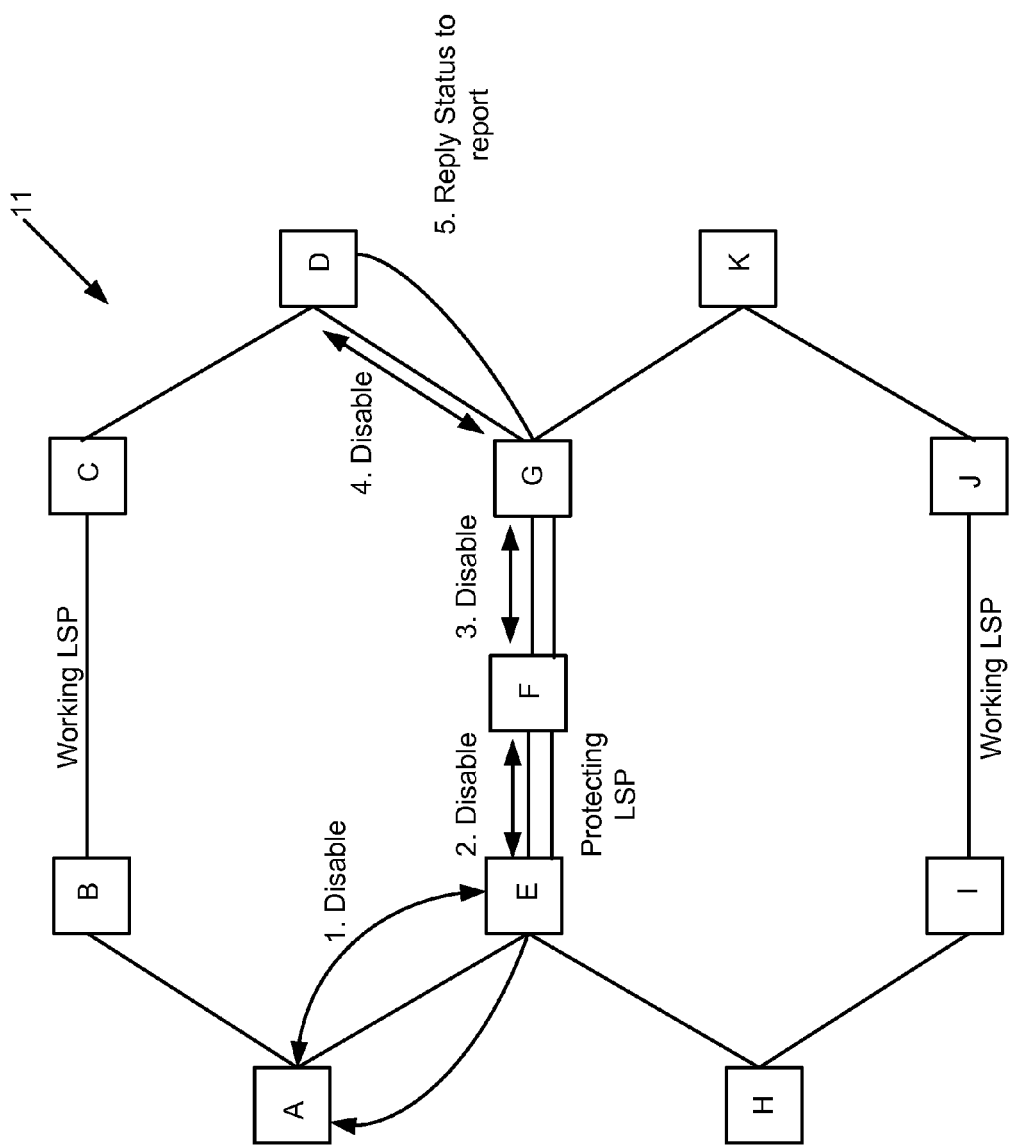
FIG. 17 is a block diagram of the exemplary mesh network formed of multiple nodes illustrating an exemplary deactivation process disabling a protecting connection utilizing disable messages from the head end nodes in accordance with the present disclosure.
Figure 18:
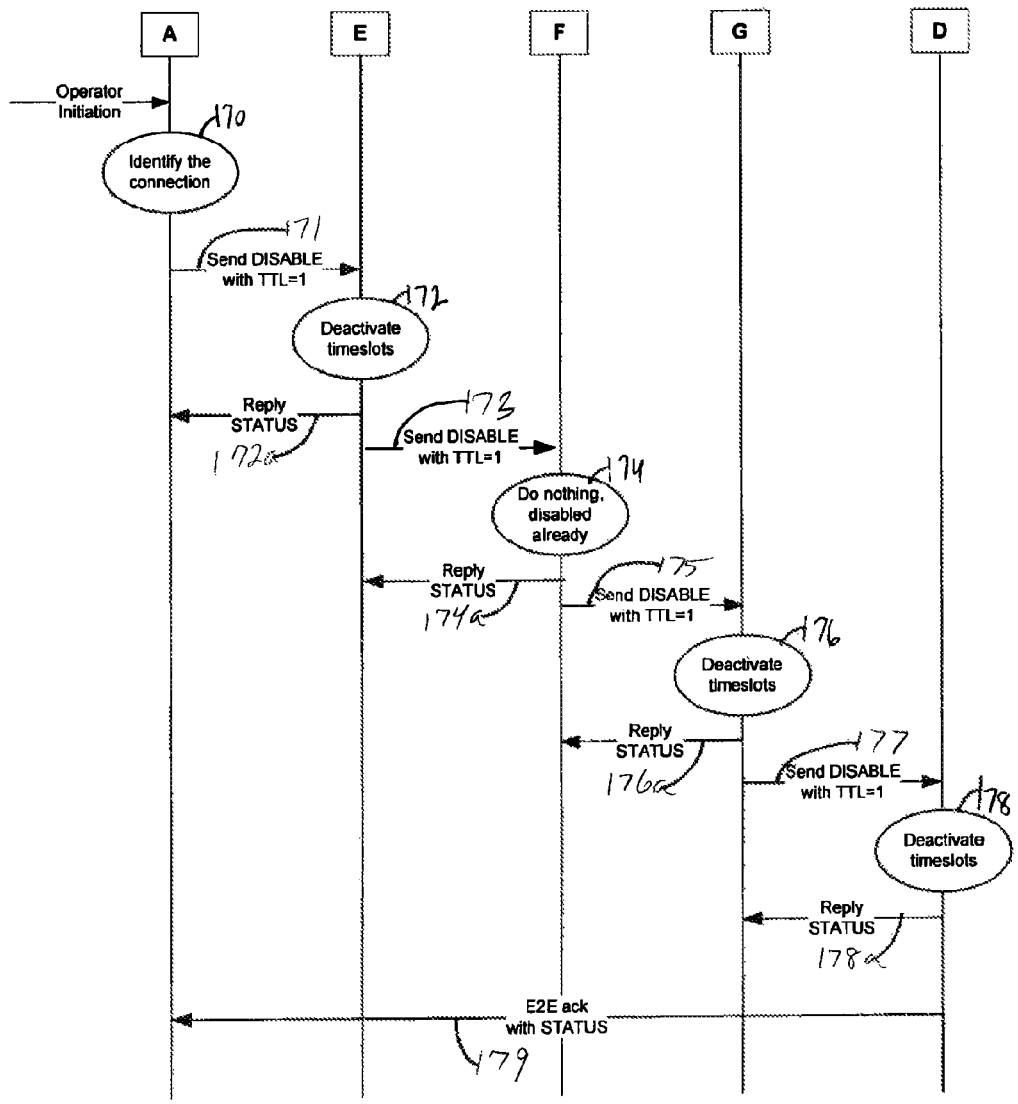
FIG. 18 is a timing diagram illustrating the deactivation process depicted in FIG. 18.

This is a typical cleanup operation by an operator that is enabled via the headend node A identifying the protecting connection (as shown in FIG. 18 as block 170) and then transmitting a DISABLE message 104*b* to the first intermediate node in the protecting connection as indicated by a numeral 1 in FIG. 17, and by step 171 in FIG. 18, which in this example is the intermediate node E. Upon the reception of the DISABLE message 104*b*, the intermediate nodes E, F and G will deactivate the timeslots as indicated in FIG. 18 steps 172, 174, 176 and 178, send the STATUS message 104*d* (as shown in FIG. 18 steps 172*a*, 174*a*, 176*a* and 178*a*), and then forward the DISABLE messages 104*b* downstream regardless as indicated by the numerals 2, 3 and 4 in FIG. 17, and by steps 173, 175, and 177 in FIG. 18.

It should be noted that network resources on some of the intermediate nodes E, F and G may have been released already, however, the intermediate nodes E, F and G are preferably adapted to forward the deactivation messages downstream regardless, as shown in FIG. 18 steps 173, 174, and 175. In the example, intermediate node F has already been disabled and has no timeslots to deactivate. Thus, the intermediate node F will send a reply STATUS message 104*d* (step 174*a*) and then forward the DISABLE message 104*b* to the next node (step 175), i.e., intermediate node G in the protecting connection. Upon receipt of the DISABLE message 104*b* by the tailend node D, the tailend node D transmits the acknowledgement or STATUS message 104*d* as indicated by the numeral 5 in FIG. 17, and by steps 178*a* and 179 in FIG. 18.

Query a Protecting Connection

Figure 19:
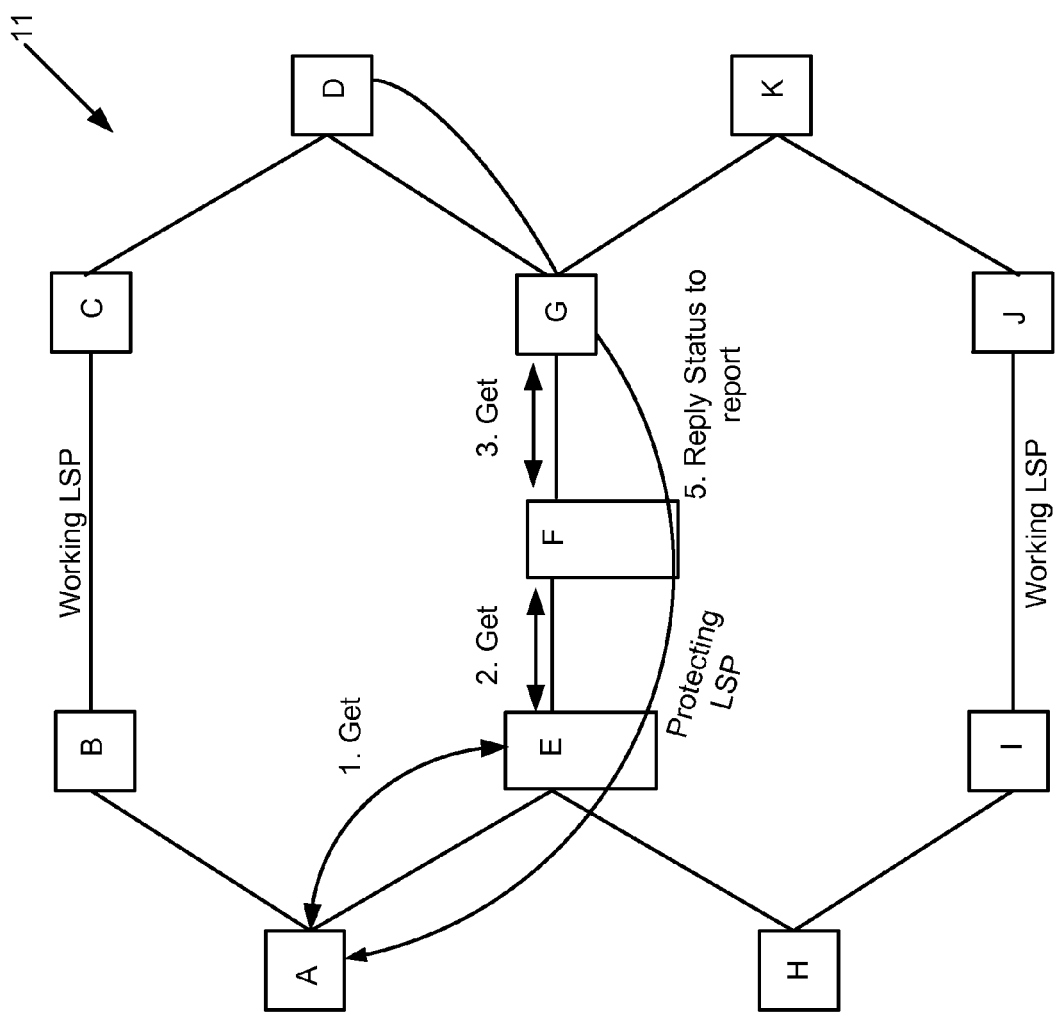
FIG. 19 is a block diagram of the exemplary mesh network formed of multiple nodes illustrating an exemplary query process to determine the status of protecting connections periodically or on-demand.
Figure 20:
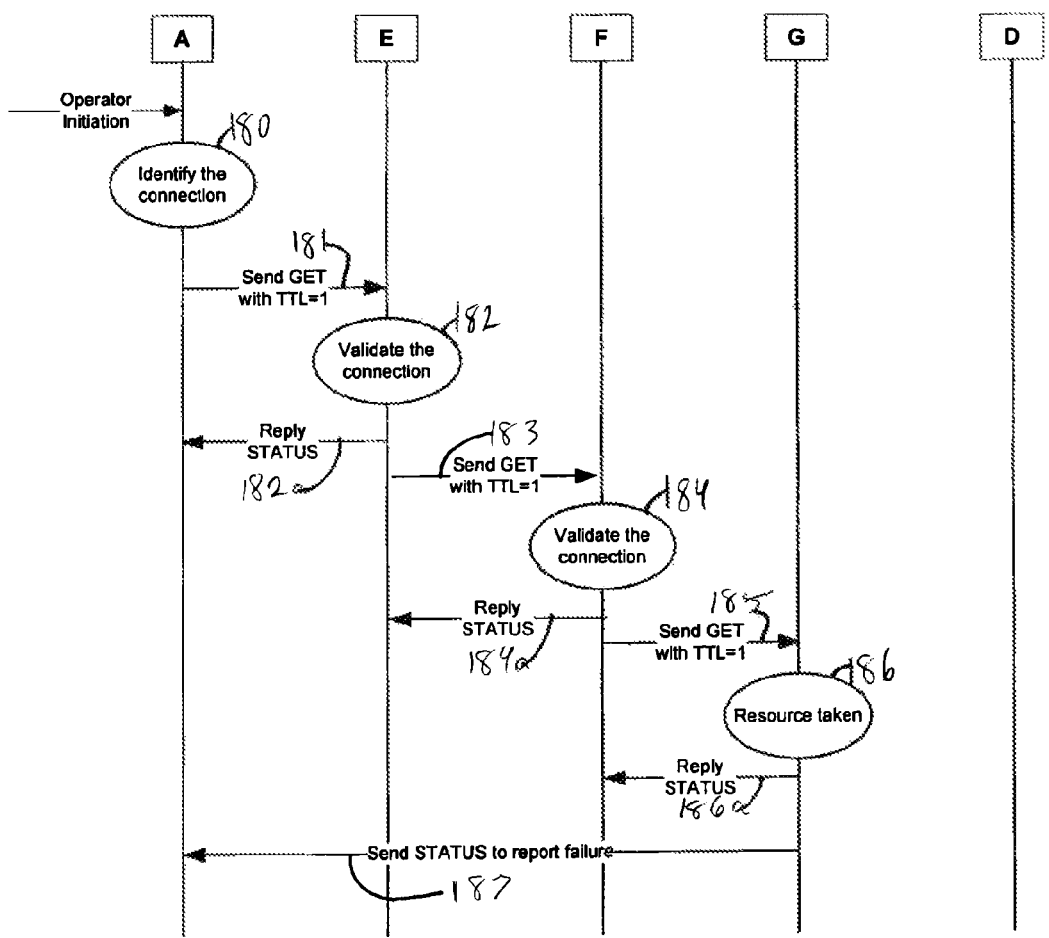
FIG. 20 is a timing diagram illustrating an exemplary query process.

As shown in FIGS. 19 and 20, operators may trigger GET messages 104*c* from the headend node A to check on the protecting connections periodically or on-demand. The processing of GET messages 104*c* should be nearly identical to that of ENABLE messages 104*a* on the intermediate nodes E, F and G, except that the GET messages 104*c* should not trigger any timeslot programming.

As shown in FIG. 20, one or more operators identify a particular protecting connection as indicated in step 180. To check on the protecting connection, the GET messages 104*c* are transmitted from the headend node A to the intermediate node E as indicated by the numeral 1 in FIG. 19 and by step 181 in FIG. 20; from the intermediate node E to the intermediate node F as indicated by the numeral 2 in FIG. 19 and by step 183 in FIG. 20; and from the intermediate node F to the intermediate node G as indicated by the numeral 3 in FIG. 19, and by step 185 in FIG. 20. Upon receipt of the GET messages 104*c*, the intermediate nodes E, F and G, check on the status of the resource and validate the connection if available as indicated by steps 182 and 184.

In the example depicted in FIGS. 19 and 20, the resource on intermediate node G is no longer available (due to preemption) as indicated by step 186 in FIG. 20. Thus, upon receipt of the GET message 104*c* (shown in step 185 in FIG. 20), intermediate node G will send the STATUS message 104*d* to the headend node A reporting that intermediate node G is no longer available (i.e., the resource is taken) as indicated by a numeral 5 in FIG. 19 and by step 186*a* and 187 in FIG. 20.

In the preferred embodiment, the intermediate nodes E, F and G need to validate the connection without making changes to the switch fabric module 34. In this example, the resource on intermediate node G has been taken by a higher priority connection. Thus, intermediate node G will send the STATUS message 104*d* with status (134)=301, and MPLS TTL (122*b*)=0xFF.

Preemption Handling

Figure 21:
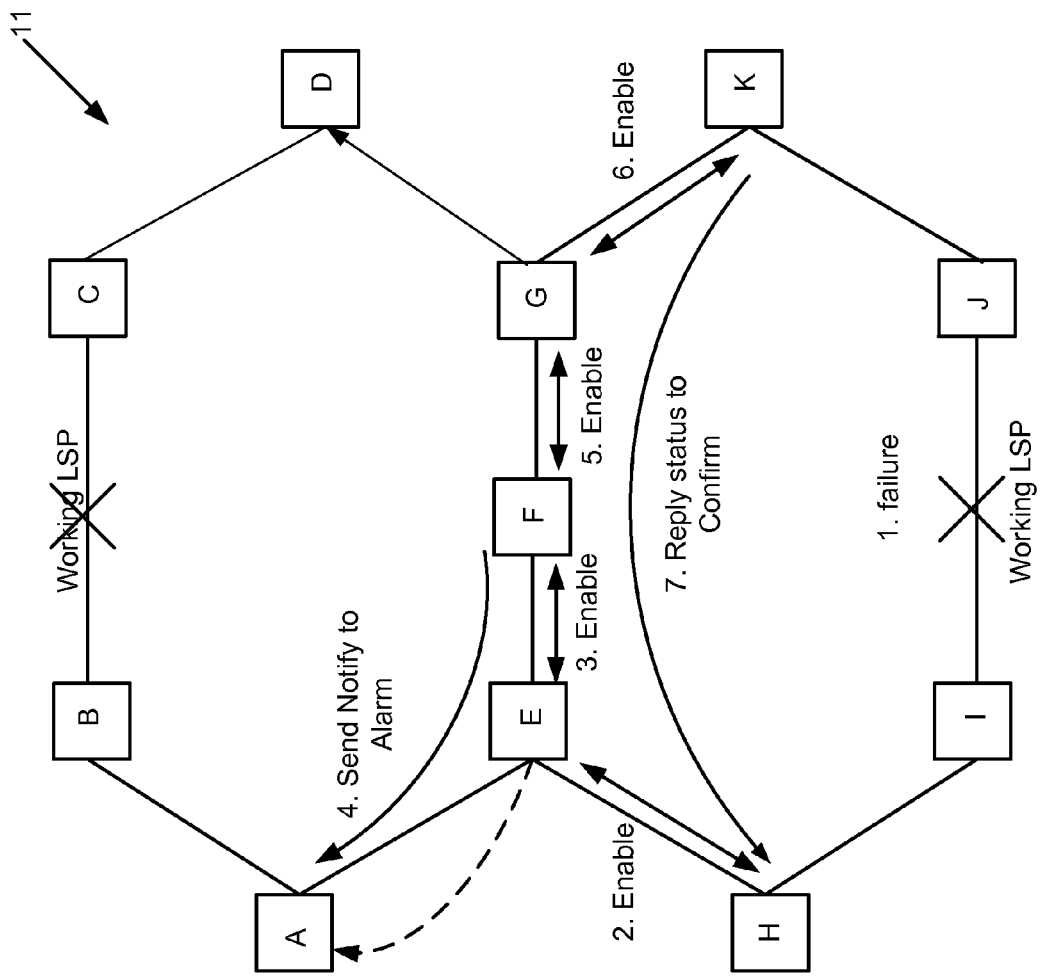
FIG. 21 is a block diagram of the exemplary mesh network formed of multiple nodes illustrating an exemplary operation of pre-emption handling where the protecting connection (A, E, F, G, D) is preempted by connection (H, E, F, G, K) on transport node F.
Figure 22:
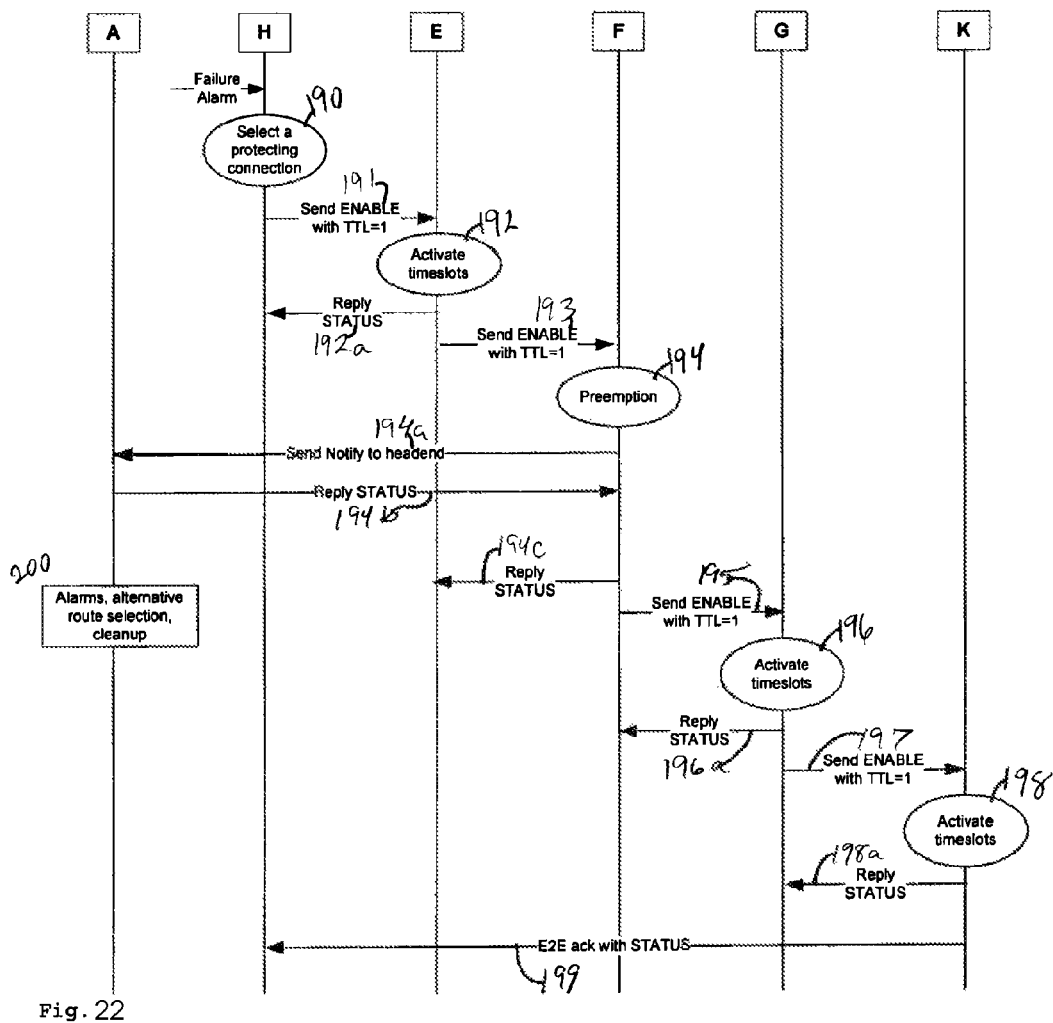
FIG. 22 is a timing diagram illustrating an exemplary pre-emption operation sequence where an intermediate node notifies a corresponding head end node to select another protecting connection, and clean up the timeslots with disable messages, for example.

FIGS. 21 and 22 show exemplary operations for handling preemption of the protecting connection by another combination of headend nodes A and/or H and tailend nodes D and/or K. In this example, the headend nodes A and H both have protecting connections utilizing intermediate nodes E, F and G. The headend node H detects a failure in its working connection between nodes I and J as indicated by the numeral 1 in FIG. 21, selects a protecting connection, as indicated by step 190 in FIG. 22, and then enables the protecting connection (H, E, F, G and K) using a series of ENABLE messages 104*a* as discussed above (also see FIG. 22 steps 191, 193, 195, and 197). The intermediate nodes E, G and K activate timeslots as indicated by steps 192, 196 and 198, and send status messages as indicated by steps 192*a*, 196*a* and 198*a*. However, the protecting connection (including nodes A, E, F, G, D) is preempted by the working connection (including nodes H, E, F, G, K) on node F.

The intermediate node F sends a Preemption Notification message 194*a* to the headend node A where the intermediate nodes E, F and G had been configured as protecting connections (FIG. 22, step 194*a*). The headend node A will, in turn, reply 194*b* to the intermediate node F, and then raise the alarms, select another protecting connection, and clean up the resources with DISABLE messages 104*b* (FIG. 22, step 200). In addition, the node F will also send the status message 194*c* responsive to the ENABLE message 104*a* depicted in step 193.

5. Implementation Methods

In previous sections, we have described the WAKEUP protocol handling on nodes 10 and 10*a*. In this section, we describe the handling of activation inside the mesh network 11.

FIGS. 1 and 2 exemplify nodes 10 and 10*a* that will implement the WAKEUP protocol described herein. Specifically, in FIG. 1, the input interface(s) 12 are the devices that will receive and transmit the control messages for the WAKEUP protocol. In FIGS. 2 and 4, the transport interface module 50, 52, 54 or 56; and/or the ingress line module 66 and/or the egress line module 68 are the devices within the nodes 10 and 10*a* that will receive and transmit control messages utilizing FCP logic that will handle the incoming messages, and perform required activation, deactivation and query procedures.

Figure 23:
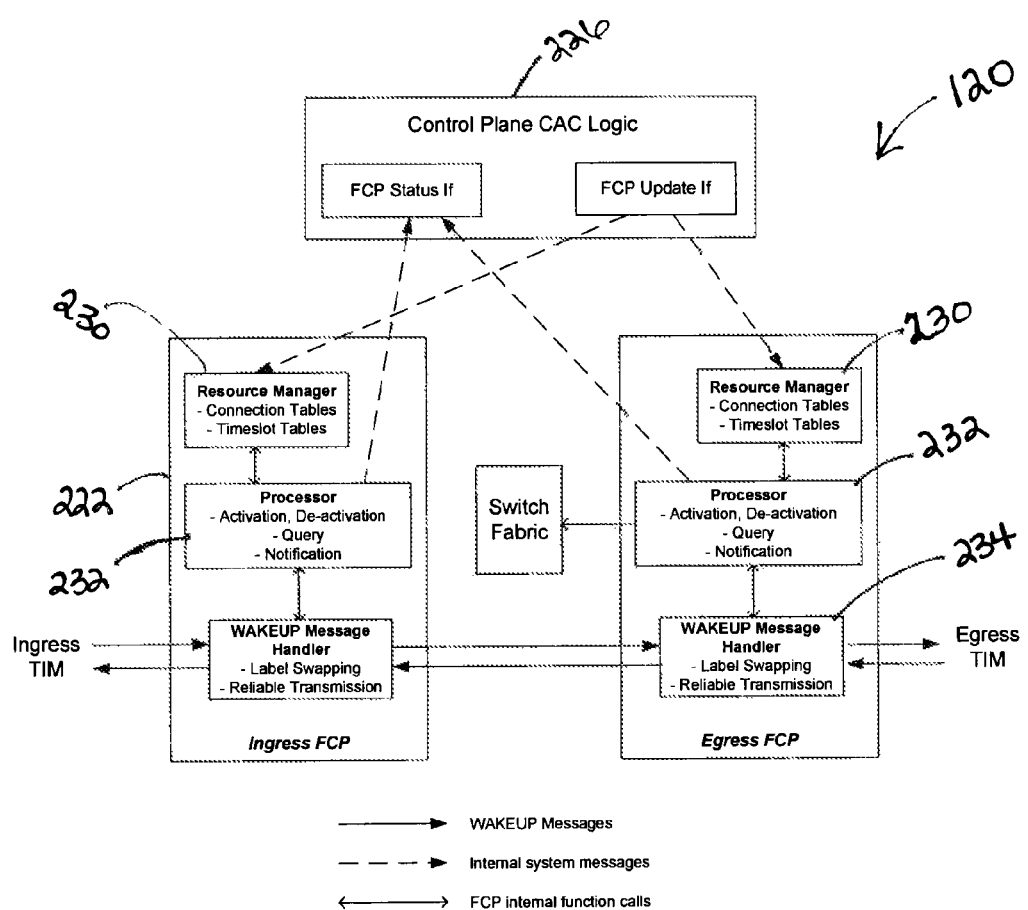
FIG. 23 is a block diagram of exemplary fast control plane logic for WAKEUP messaging handling between an ingress FCP, an egress FCP and a Control Plane CAC logic.

FIG. 23 is a block diagram of exemplary fast control plane logic 120 for a particular connection having an ingress FCP 222, an egress FCP 224 and control plane CAC logic 226. The ingress FCP 222 and the egress FCP 224 include a resource manager 230, a processor 232 and a WAKEUP message handler 234 functioning together to interface with the control plane 70, processing WAKEUP messages 100 and handling internal operation.

Control-Plane Interface

In the preferred embodiment, the control-plane CAC logic 226 and the ingress FCP 222 and egress FCP 224 maintain a master-slave relationship as follows: all control functions, including connection setup, admission control and timeslot assignment, are performed by the control-plane CAC logic 226. The control-plane CAC Logic 226 is responsible for downloading relevant connection and timeslot information to the resource manager 230 of the ingress FCP 222 and the egress FCP 224; the ingress FCP 222 and the egress FCP 224 are responsible for processing the WAKEUP messages 100, and performing functions, such as activation, de-activation and query. The ingress FCP 222 and the egress FCP 224 are responsible for uploading the relevant alarms and status to the control-plane CAC logic 226 for further processing.

Connection and Timeslot Information Updating to FCP

Upon the completion of connection setup and timeslot allocation, in the preferred embodiment the control-plane CAC Logic 226 sends the following information to both the ingress FCP 222 and the egress FCP 224 for each protecting connection. In a preferred embodiment, there are at most 4,000 such connections per FCP.

Action:
Delete: this is to remove an existing connection on FCP
Ingress Receive Label, Ingress_Rx:
This is a 12-bit label to be received in a WAKEUP message 100 from upstream
Ingress Transmit Label, Ingress_Tx:
This is a 12-bit label to be used to communicate with the upstream node
Egress Receive Label, Egress_Rx:
This is a 12-bit label to be received in a WAKEUP message 100 from downstream
Egress Transmit Label, Egress_Tx:
This is a 12-bit label to be used to communicate with the downstream node
Timeslots:
This is an array indicating the timeslots associated with the connection
A first entry (or the head of the array) contain a smallest timeslot number
A maximum number of entries in the array can be 400
Priority:
This is an integer indicating the importance of the connection. Normally, the priority is either three (working connection), 4 (high-priority protecting connection) or 5 (low-priority protecting connection). In general, the smaller the value, the higher the importance although this could be changed in other embodiments.
TID (Transport Interface Module ID) and PID (Port ID):
This identifies a transport interface module where the messages are received (on Ingress FCP 222), and transmitted (on Egress FCP 224)
FCP SID:
This identifies the FCP where WAKEUP messages are received (on Egress FCP 224), and transmitted (on Ingress FCP 222)
SW SID (Switch Slot ID):
This identifies the switch fabric module 34 that is responsible for timeslot programming
Connection Attributes:
Headend (ON/OFF): this indicates if this is the headend node A and/or H of the protecting connection
Tailend (ON/OFF): this indicates if this is the tailend node D and/or K of the protecting connection
Timer information:
Each protecting connection preferably needs to manage at least two timers:
One for hop-by-hop reliable messaging
One for per-session activation time-out
Next protecting connection:
At head-end, each working connection may be protected by a chain of protecting connections. So when one protecting connection has failed to get activated, the next protecting connection in the chain could pick up the protecting task.

In addition, each FCP 120 needs to manage the activities on the timeslots. In a preferred embodiment, there is at most 400 timeslot entries per-FCP. For each timeslot, the control-plane CAC logic 226 needs to populate the entry with the following:
Active Connection:
This is the protecting connection that is currently protecting a working connection. This is NULL if the timeslot is idle
Reserved Connections:
In one embodiment, each timeslot can be reserved by 10 protecting connections. To support preemption operation, the implementation needs to be able to access all the protecting connections that have a reservation.

Upon the reception of the protecting connection and timeslot messages, the FCP can build required tables for processing.

Headend Notification from FCP

The ingress FCP 222 and the egress FCP 224 can interface with the Control Plane CAC Logic 226 to inform protecting connection condition. In a preferred embodiment, each message includes the following:
Connection identification:
FCP only contains the labels, so it will use the Ingress Receive Label, Ingress_Rx, to identify the protecting connection
FCP identification:
The FCP identification can be the slot id
Status: the status may include the following information
1xxx hoc: OK
101: succeed on end-to-end
2xx: message processing errors
201: no such protecting connection
202: bad message
203: no response from next-hop
3xx: processing issues:
301: no more resource for the protecting connection
302: preempted by another working and/or protecting connection
303: system failure
4xx: informative data:
401: shared resource has been taken by some working and/or protecting connection
Failure Location:
This is derived from TTL field in the Notify message 104e
In the context of protection activation, all operation is preferably coordinated from the headend nodes A and/or H. Specifically, preferably only the ingress FCP 222 at the headend node A and/or H is responsible for sending notifications to the control plane CAC Logic 226.

Figure 24:
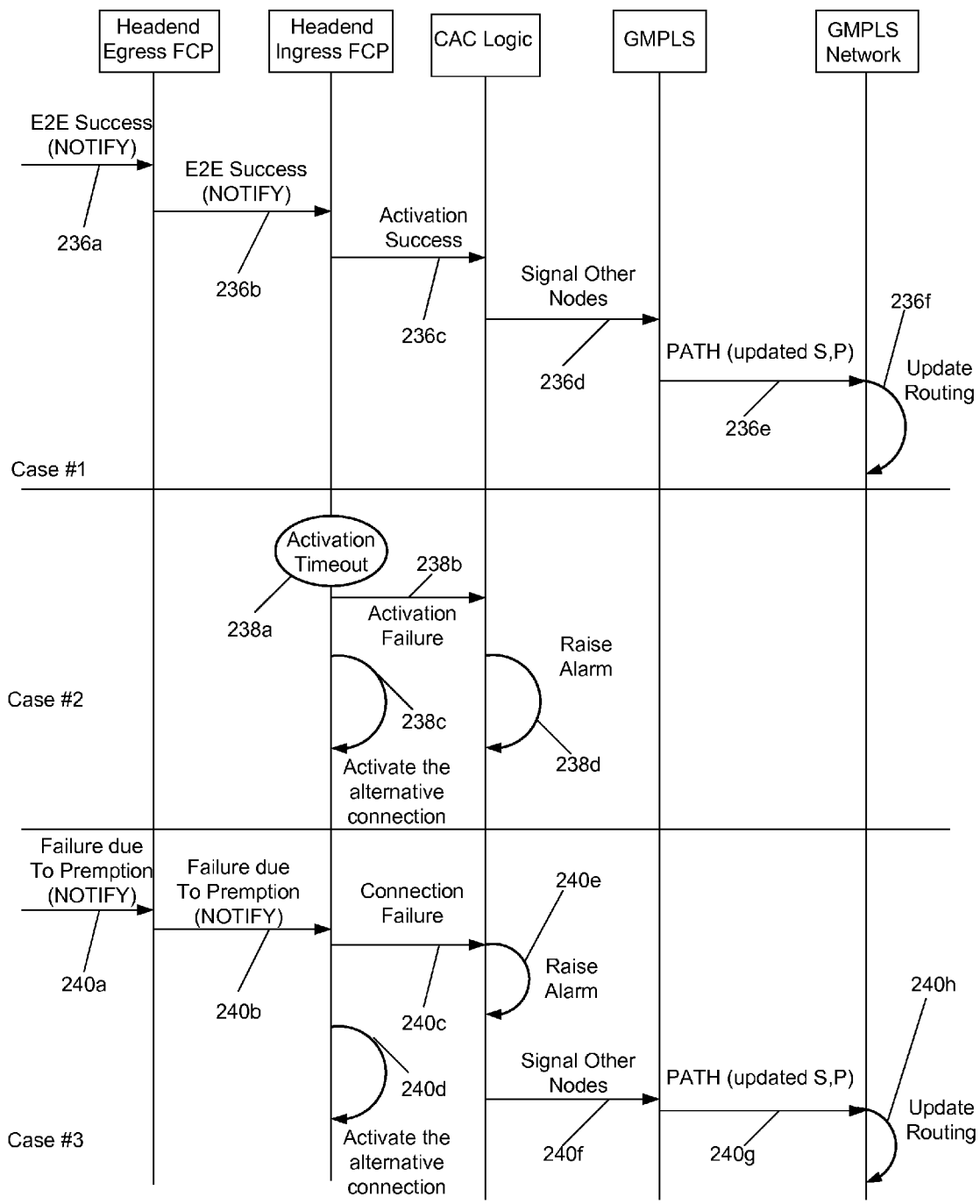
FIG. 24 is a timing diagram showing the communication between an egress FCP, an ingress FCP, a control-plane CAC logic, a GMPLS logic and other nodes in a GMPLS based network.

Shown in FIG. 24 are three exemplary cases for activating a protecting connection. The FCP 120 notifies the Control Plane CAC Logic 226 under the following conditions, as illustrated in FIG. 24:

Activation success: As shown in Case 1, when an activation of a protecting connection has been successfully completed, the tailend node D or K will inform the headend node A or H with a NOTIFY message 104e with STATUS=101, for example, as shown in step 236a. The egress FCP 224 at the headend node A or H receives the NOTIFY message 104e, and informs the ingress FCP 222 of the headend node A or H of the NOTIFY message 104e, in step 236b. The ingress FCP 222 at the headend node A or H then passes information of location of an error and a description of the error in the NOTIFY message 104e to the control-plane CAC Logic 226 in step 236d, which will trigger the GMPLS protocol to sync-up the control planes of the nodes A-K in the mesh network 11, as shown in steps 236e and 236f.

Activation Failure: As shown in Case 2, if there is a failure during activation of a protecting connection, the ingress FCP 222 of the node A-K that detected the failure notifies the Control Plane CAC Logic 226 of the headend node A or H, as shown in step 238b. In the example, the failure is caused by headend node session time-out shown as step 238a. The ingress FCP 222 will notify the Control Plane CAC Logic 226 about the activation failure (step 238b), which, in turn, will alarm the management plane (step 238d). The management plane is software that one or more operator uses to manage the mesh network 11. The ingress FCP 222 activates the alternative connection, as shown in step 238c.

Operational Connection Failure: As shown in Case 3, if an operating connection has failed, for example, being preempted by another connection, the egress FCP 224 at the headend node A or H receives the NOTIFY message 104e indicative of a failure (shown in step 240a) and passes the NOTIFY message 104e to the ingress FCP 222 of the headend node A or H (step 240b). The ingress FCP 222 of the headend node A or H notifies the control-plane CAC logic 226. As shown in Case 3, step 240c, the ingress FCP 222 sends the failure information to the control-plane CAC Logic 226, which will raise the alarm in step 240e, trigger the GMPLS protocols in step 240f to sync-up the control planes 70 of the other nodes A-K in the mesh network 11 in steps 240g and 240h. The ingress FCP 222 activates the alternative connection, as shown in step 240d.

Query responses: An operator may probe and diagnosis a particular protecting connection with GET messages 104c to see if the protecting connection is still available and/or functioning properly. The headend nodes A and/or H forward any information received in a STATUS message 104d to the control-plane CAC logic 226 for further processing.

FCP Connection and Timeslot Management
Activation Tables

Figure 25:
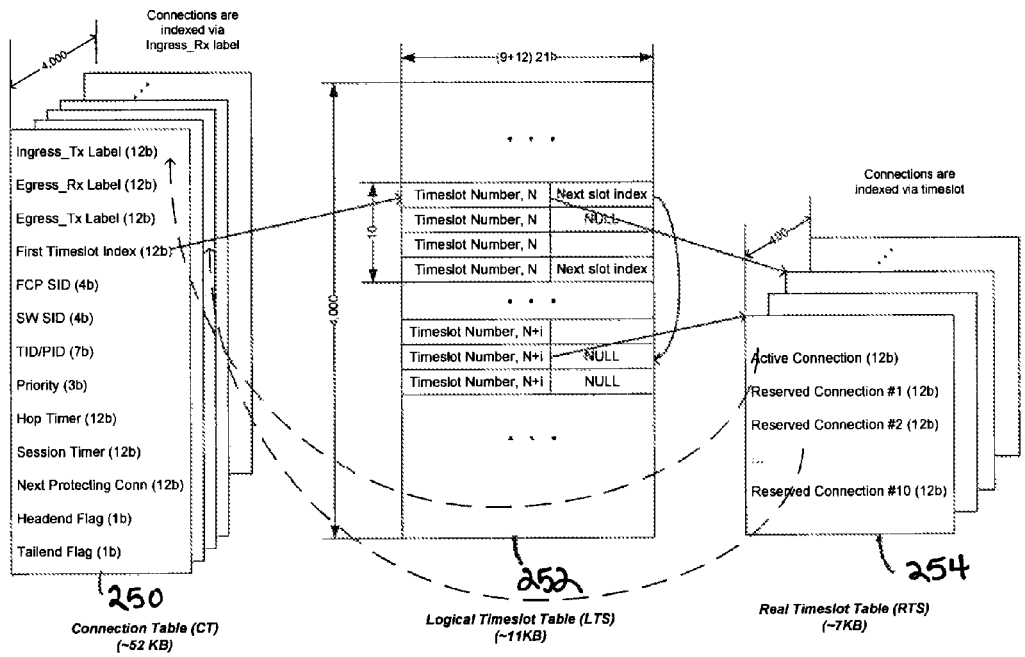
FIG. 25 is a block diagram illustrating exemplary logical tables used for WAKEUP messaging handling.

This section will outline the logical tables that are used to support the protecting connection activation logic. Shown in FIG. 25 are the tables that will be preferably initiated at system bootup time. In the preferred embodiment, all entries will be populated by the control plane 70. In general, the tables include one or more connection table 250, one or more logical timeslot tables 252, and one or more real timeslot table 254. The connection table(s) 250 maintains the connection-related information, including label, interfaces and associated timeslot information, for all connections which in the preferred embodiment is 4000 possible connections. The logical timeslot table(s) 252 is a timeslot translation table between connections and timeslots. The real timeslot table(s) 254 maintains the timeslot-related information, including the active connections that are currently conveying traffic and reserved connections for all timeslots. The reserved connection means there is not any active traffic on the timeslots. The preferred embodiment includes 400 timeslots, although this can be varied.

Generally, the protection operation is triggered in at least two manners, i.e., from nodes A-K identified by connections or from timeslots. When the protection operation is triggered from the connections, e.g., the arrival of WAKEUP messages 100 (activation, deactivation, query); the connection-ids (i.e. labels) are used to retrieve all the associated timeslots. Once a protecting connection is identified in the connection table 250, its associated timeslots can be readily discovered utilizing the logical timeslot table 252 and the real timeslot table 254.

For example, during an activation sequence: from the protecting connection entry in the connection table 250, the implementation can walk through the timeslot chain in the logical timeslot table 252 to activate the protecting connection. Upon completion, it will write its id (label) as an active connection in the real timeslot table 254.

During a deactivation and query sequence, the same logical path is followed as during an activation sequence. That is, upon the detection of protection failure, the headend node A and/or H can find the next protecting connection, and initiate the protection immediately over another protecting connection.

When the protection operation is triggered from the timeslots, there is an arrival of an alarm signal to trigger protection at the headend nodes A and/or H. From the effected timeslots, all relevant connections are retrieved, and then once the timeslot has been identified in the real timeslot table(s) 254, the corresponding connections can be located in the connection table 250 via the connection ids (labels).

For example, when initiating protection from the headend node A or H: from the alarm, the preferred implementation can spot the timeslots, and find the appropriate connection from a reserved connection lists in the real timeslot table(s) 254. Once a reserved connection is selected from the real timeslot table 254, the headend node A or H looks up a record for the reserved connection in the connection table 250 and uses the information in the record to build and transmit the activation messages.

During a preemption operation: upon the reception of an ENABLE message 104a, the preferred implementation will first find a label within the ENABLE message 104a, and index into the connection table(s) 250 to locate the connection. Then it can walk through the timeslot chain and locate the timeslots in the real timeslot table(s) 254. If the timeslot has been occupied by another protecting connection, the intermediate nodes B, C, E, F, G I and/or J need to compare the priorities levels and determine if a preemption action is possible. Upon preemption, the implementation utilizes the Connection Table 250, and initiates the NOTIFY messages 104e to inform the headend node A or H of the preempted connection.

Switching Messages between FCP and TIM

Figure 26:
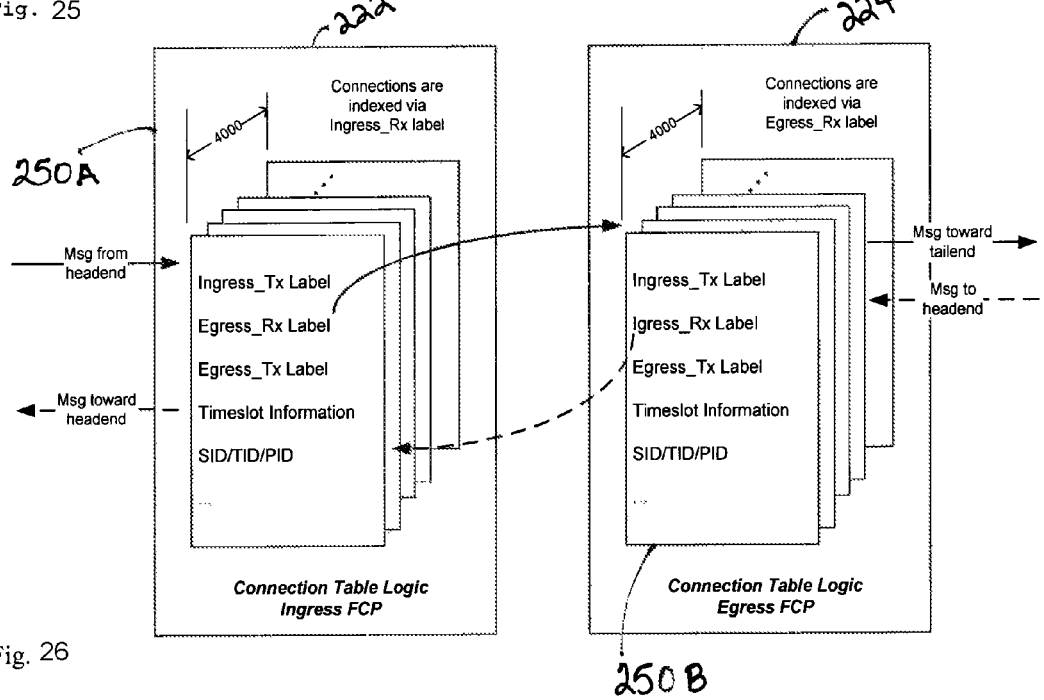
FIG. 26 is a block diagram illustrating exemplary logical tables used by the ingress FCP and the egress FCP form switching messages between the FCP and the transport interface modules.

In general, the labels for the WAKEUP messages 100 are negotiated utilizing the GMPLS protocols, as explained above. In particular, shown in FIG. 26 is an example of how the connection tables 250 are populated at the ingress FCP 222 and the egress FCP 224. The ingress FCP 222 and the egress FCP 224 organize the connections based on the labels that are expected to be received. The connection entries can be arranged as an array, with the receiving label as the index, for example.

Upon reception of the WAKEUP message 100, the egress FCP 224 can extract the label from the WAKEUP message 100, and use the label to index to the associated connection entry directly.

Each connection has at least one entry on the ingress FCP 222, another, on the egress FCP 224. The connection on the ingress FCP 222 can be accessed via the Ingress_Rx label—the label expected to be received from an upstream node. The connection on the egress FCP 224 can be accessed via the Egress_Rx label—a label expected to be received from a downstream node.

To relay the messages between the ingress FCP 222 and the egress FCP 224, the ingress FCP 222 transfers the messages to an associated Egress_Rx label on the connection table 250 of the egress FCP 224. Inversely, the egress FCP 224 transfers the messages to an associated Ingress_Rx label on the connection table 250 of the ingress FCP 222.

During the process of the WAKEUP message 100, the ingress FCP 222 may use an Ingress_Tx label to transmit the message upstream, and the egress FCP 224 may use an Egress_Tx label to transmit the message downstream.

It is possible that Ingress FCP 222 and Egress FCP 224 are the same FCP that is responsible for activating a connection between two GCC's channels.

Finally, ingress labels at the headend node A and/or H and egress labels at the tailend node D and/or K can be meaningless in the context of GMPLS label signaling utilizing the GMPLS protocol. For processing simplicity, the control-plane CAC logic 226 can download valid labels to the ingress FCP 222 and the egress FCP 224 regardless.

An example of the general processing is set forth below. When a message arrives from GCC (arriving on an ingress FCP 222), the ingress FCP 222 extracts the label from the message (the label is called Ingress_Rx), indexes the Connection Table 250 with Ingress_Rx, and processes the message. If a reply is to be sent, the ingress FCP 222 builds the reply message and encapsulates it with an Ingress_TX, builds an internal messaging header with the information provided by the TID, and transmits the message to the same GCC where it comes from via the PID. If the message needs further processing on the egress FCP 224, the label of the message is swapped with the Egress_Rx, the MAC header is built with the information provided by SID, and then the message is transmitted to the FCP interface.

When a message arrives on an egress FCP 224, a label from the message is extracted (the label is called Ingress_Rx), the connection table 250 is indexed with the Ingress_Rx, and the message is processed. If a reply should be transmitted, then the egress FCP 224 swaps the label with Egress_Rx, builds the internal messaging header with the information provided by SID, and transmits the message to the ingress FCP 222.

If the message needs to be forwarded to another node A-K in the mesh network 11, the egress FCP 224 swaps the label with Ingress_Tx, builds the internal messaging header with the information provided by TID, and then transmits the message on the in-band channel, such as the GCC.

Activation Processing on FCP

The following is a summary of possible events received on the FCP 120:

On ingress FCP 222:
1. Arrival of activation (ENABLE)
2. Arrival of de-activation (DISABLE)
3. Arrival of query (GET)
4. Arrival of acknowledgements (STATUS)
5. Arrival of end-to-end messages to be switched (NOTIFY, STATUS)

On egress FCP 224:
1. Arrival of activation (ENABLE)
2. Arrival of de-activation (DISABLE)
3. Arrival of query (GET)
4. Arrival of acknowledgements (STATUS)
5. Arrival of end-to-end messages to be switched (NOTIFY, STATUS)

Special treatment at the ingress FCP 222 of the headend node A and/or H:
1. Arrival of alarms to trigger activation (generating ENABLE messages)
2. Arrival of user-initiated activation (ENABLE)
3. Arrival of user-initiated deactivation (DISABLE)
4. Arrival of user-initiated query (GET)
5. Arrival of notification (NOTIFY) from nodes
6. Arrival of failure report (STATUS) from nodes: require new route selection
7. Arrival of acknowledgements (STATUS)
8. Expiration of session-timer (need to initiate a new protection)

Messaging Processing Logic

Figure 27:
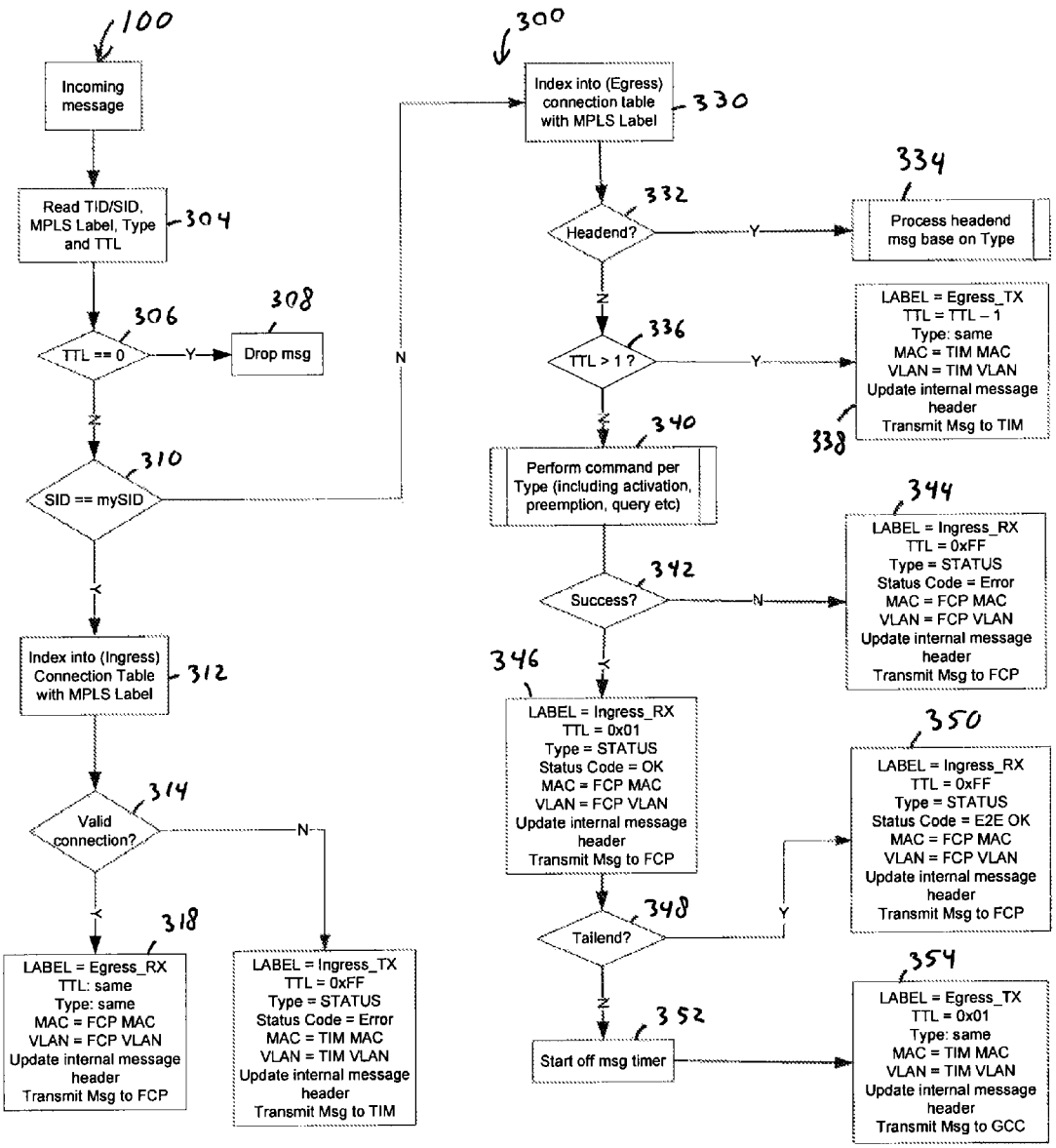
FIG. 27 is a logic flow diagram of exemplary processing logic on the FCP.

FIG. 27 shows an exemplary message processing logic 300 executing on the FCP 120 upon reception of the WAKEUP message 100. The process of FIG. 27 may be performed by one or more components within the node A-K, such as the ingress line module 66 and/or the egress line module 68.

The message processing logic 300 begins upon the reception of an incoming WAKEUP message 100, which can arrive on a single Ethernet port on FCP 120, depending upon the configuration of the communication links. Once the WAKEUP message 100 is received, the message processing logic 300 branches to a step 304, where the WAKEUP message 100 fields are read for TID/SID, MPLS Label 122*a*, Type 104, and MPLS TTL 122*b*. The message processing logic 300 then proceeds to decision step 306, where, if MPLS TTL 122*b* has a value of zero, then the decision is made in step 308 to drop the message. But if MPLS TTL 122*b* does not have a value of zero, then the message processing logic 300 proceeds to decision step 310 where, the FCP 120 determines whether to process the message as the ingress FCP 222 or the egress FCP 224. This can be done by checking the SID in the internal messaging header. If a message arrives from the transport interface module 50, 52, 54 or 56, the FCP 120 is considered as an ingress FCP 222, otherwise, the FCP 120 is an egress FCP 224.

If the FCP 120 is an ingress FCP 222, the message processing logic 300 moves to step 312 and the message is indexed into an ingress connection table 250*a* with the MPLS label 122*a*. The FCP 120 can access the ingress connection table 250*a* by indexing with its own label.

On ingress, the process moves to step 314 in which the FCP 120 can conduct various validation tests. Each validation test can be as extensive as checking out the timeslots. If the valid connection is not confirmed, then, in step 316, the Status Code 134 is changed to Error, the message is transmitted to TIM. If the valid connection is confirmed, then in step 318, the FCP 120 will pass the message to the egress FCP 224. The MPLS Label 122*a* is changed to Egress_RX, and the message is transmitted to the egress FCP 224. The egress FCP 224 performs two key functions, i.e., Headend processing as described previously; and running the commands including activation, de-activation, query, preemption etc.

If after checking the SID in the internal messaging header in decision step 310, the FCP 120 is considered the egress FCP 224, then the message processing logic 300 moves to step 330 and indexes the message into the egress connection table 250*b* with the MPLS label 122*a*. Next, the process moves to decision step 332 to determine if the node is the headend for the message. If the answer is yes, then, in step 334, the WAKEUP message 100 is processed based on Type 104. If the answer is no, then the process looks at the MPLS TTL value 122*b* in decision step 336. If the MPLS TTL value 122*b* is greater than one, then, in step 338, the MPLS Label 122*a* is changed to Egress_TX and the message is transmitted to TIM. If the MPLS TTL value 122b is not greater than one, then, in step 340, the message processing logic 300 performs the command per the Type 104 (such as activation, preemption, query, etc.).

Then the message processing logic 300 moves to decision step 342 in which success is determined In step 340, if the platform command is not successful, then the process moves to step 344 in which the MPLS Label 122a is changed to Ingress_RX, the Type 104 is changed to STATUS, where the status code 134 is "Error", and the message is transmitted to the FCP 120. If the decision step 342 determines that the platform command 340 is successful, then the process moves to step 346 in which the MPLS Label 122a is changed to Ingress_RX, the Type 104 is STATUS, where the status code 134 is "OK" and the message is transmitted to the FCP 120.

Next, the processing logic moves to decision step 348 in which it determines if the node is the tailend for the message. If the answer is yes, the process moves to step 350 in which the MPLS Label 122a is changed to Ingress_RX, the Type 104 is changed to STATUS, where the Status code 134 is "E2E OK" and the message is transmitted to the FCP 120. If the answer is no, the process moves to step 352 where the message timer is started. Then the process proceeds to step 354 in which the MPLS Label 122a is changed to Egress_TX, and the message is transmitted to the in-band channel, such as the GCC.

Timeslot Management and Programming

The egress FCP 224 can be responsible for processing the activation, de-activation, query and preemption requests. In the event of preemption, the egress FCP 224 is also responsible for initiating NOTIFY messages 104e to inform the headend node A and/or H.

Figure 28:
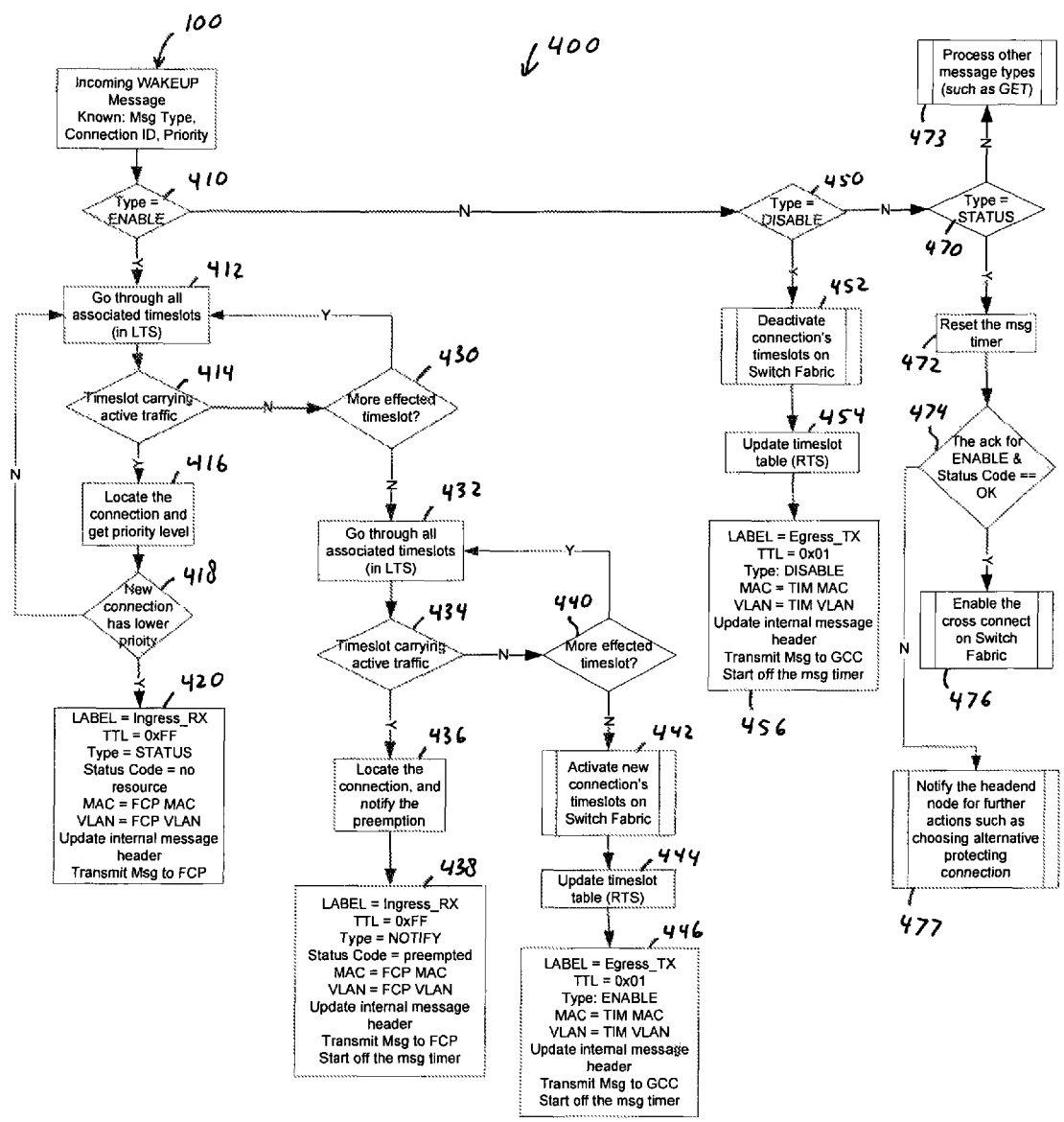
FIG. 28 is a logic flow diagram of exemplary processing logic on an egress FCP for activating a protecting connection, deactivating a protecting connection, pre-empting a protecting connection and generating notification or acknowledgement messages.

FIG. 28 outlines an exemplary processing sequence 400 taking place on an egress FCP 224. The process of FIG. 28 may be performed by one or more components of the universal transport module 32, such as the egress line module 68.

The processing sequence 400 begins upon the reception of the WAKEUP message 100. Once the WAKEUP message 100 is received, the processing sequence 400 branches to a decision step 410, where the Type field 104 of the WAKEUP message 100 is read. If the Type field 104 is not ENABLE, then the processing sequence 400 proceeds to decision step 450.

In decision step 450, the sequence determines if the Type field 104 is DISABLE. If the Type field 104 is not DISABLE, then the processing sequence 400 proceeds to decision step 470 and determines if the Type field 104 is STATUS. If the Type field 104 is STATUS, then the processing sequence 400 proceeds to step 472 in which the message timer is reset. However, if the type field 104 is not STATUS, then the processing sequence 400 proceeds to step 473 to process other types of messages. Then, the processing sequence 400 goes on to decision step 474. Here, the processing sequence 400 checks the acknowledgement for ENABLE and Status Code equaling "OK", and if so, then the processing sequence 400 moves on to step 476 in which it enables the cross connect on switch fabric module 34. If not, the processing sequence 400 branches to the step 477 to notify the headend node A or H for further actions such as choosing an alternative protecting connection.

However if the decision step 450 answer is that Type field 104 is DISABLE, then the processing sequence 400 proceeds to step 452 to deactivate the connection's timeslots on the switch fabric module 34. Then it proceeds to step 454 to update the real timeslot table (RTS) 254. In the next step, the processing sequence 400 transmits the message to the in-land communication channel, such as the GCC, starts off the message timer, updates the internal messaging header, and changes the LABEL to Egress TX, with TTL=0x01, and Type=DISABLE.

Returning to decision step 410, if the Type field 104 is equal to ENABLE, then the sequence moves to step 412 to identify all of the timeslots used by the protecting connection to be activated in Logical Timeslot Table (LTS) 252.

Then the processing sequence 400 proceeds to decision step 414 in to determine if the timeslot is carrying active traffic. If the answer is yes, the timeslot is carrying active traffic, then the sequence continues to step 416 to locate the connection and get the priority level. Then, the processing sequence 400 proceeds to decision step 418 to determine if the new protecting connection has lower priority. If the new protecting connection has lower priority, then the sequence continues to step 420. In this step, the LABEL value is set to Ingress_RX, TTL=0xFF, Type=STATUS, Status Code=no resource, internal messaging header is updated, and the message is transmitted to the FCP 120.

However, if in decision step 418 the processing sequence 400 finds that the new connection has higher priority level, then the process returns to step 412.

Returning to decision step 414, if the answer to the question "is the time slot carrying active traffic?" is no, then the processing sequence 400 moves to decision step 430 to determine if the location of other timeslots that may be effected by the new protecting connection. If the answer is yes, then the processing sequence 400 returns to step 412. If the answer is no, then the processing sequence 400 proceeds to step 432 to review all associated timeslots in the Logical Timeslot Table (LTS) 252 in preparation of modifying the Logical Timeslot Table (LTS) 252.

Then the processing sequence 400 comes to decision step 434 where the processing sequence 400 looks to see if the timeslot is carrying active traffic. If the timeslot is carrying active traffic, the processing sequence 400 moves to step 436 and locates the connection to notify the associated headend node A or H of a preemption of the protecting connection. In turn, in step 438, the processing sequence 400 changes the LABEL to Ingress_RX, the TTL=0xFF, Type=NOTIFY, Status Code=preempted, the internal message header is updated, the message timer is started, and the message is transmitted to the FCP 120.

A given protecting connection may have more than one timeslot. Returning to decision step 434, if the timeslot is not carrying active traffic, the processing sequence 400 moves to decision step 440 to determine if other effected timeslots are available. If the answer is yes, the processing sequence 400 returns to step 432. If the answer is no, then the processing sequence 400 proceeds to step 442 to activate new connection timeslots on switch fabric module 34. Then the processing sequence 400 proceeds to step 444 to update the real timeslot table (RTS) 254 to update the active entry for the protecting connection which is being activated. Finally, the processing sequence 400 moves to step 446 to set the LABEL to Egress_TX, TTL=0x01, Type=ENABLE, updates the internal messaging header, starts the message timer, and transmits the message.

Headend FCP Operation and 1:N Protection Support

In general, the headend node A and/or H manages all of the protection activities, including notifying the control plane 70, cleaning allocated resources in event of protection failure, and re-initiating protection in event of primary protecting connection failure. Most of the information for performing these functions is readily available in the connection table 250.

Figure 29:
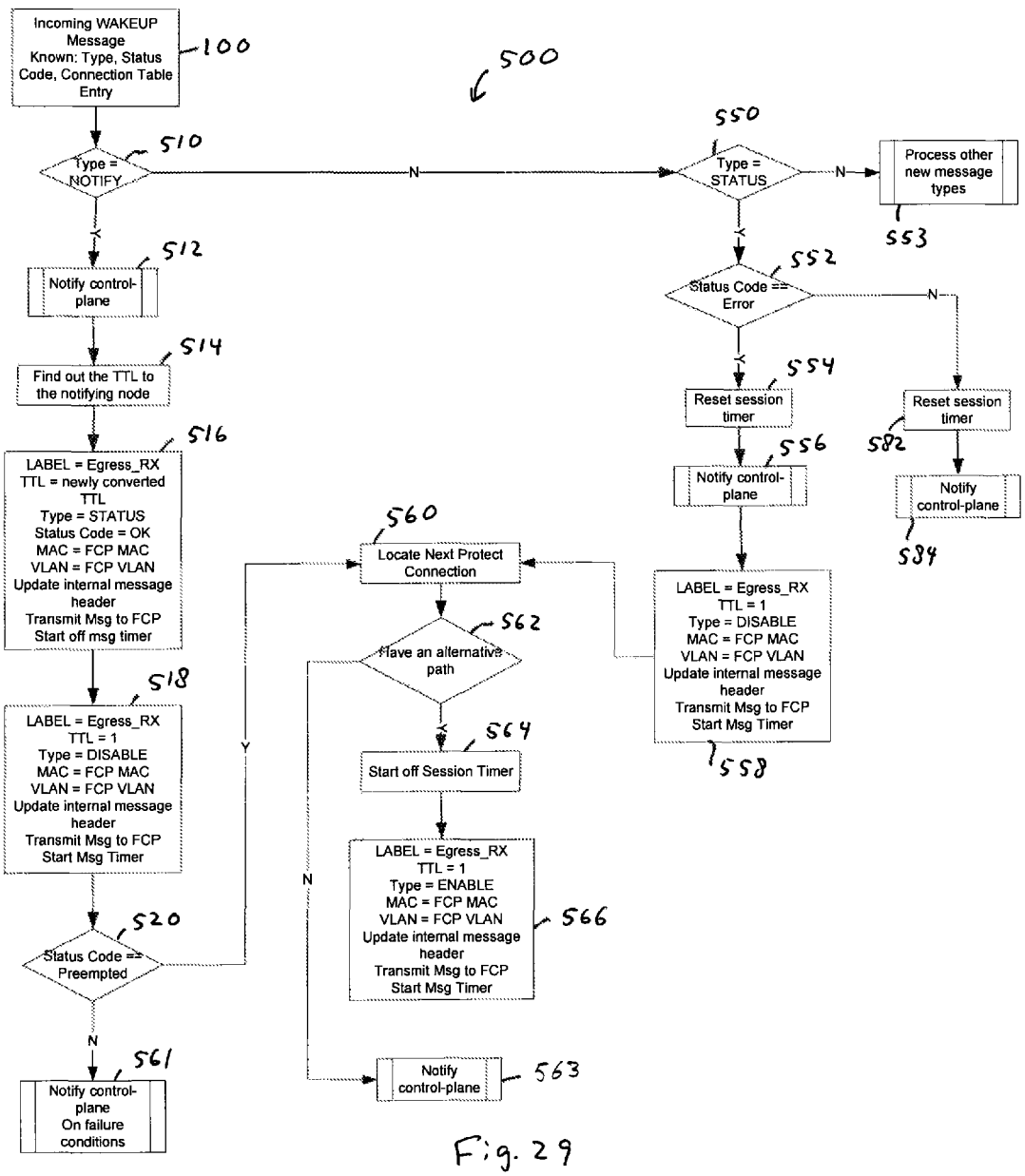
FIG. 29 is a logic flow diagram of exemplary processing logic on an egress FCP for processing NOTIFY and STATUS messages.

FIG. 29 illustrates an operation sequence 500 for control-plane reporting, and 1:N protection where N is the number of protecting connections protecting a single working connection. The process of FIG. 29 may be performed by one or more components within the headend node A and/or H The operation sequence 500 begins upon the reception of the WAKEUP message 100. Once the WAKEUP message 100 is received, the operation sequence 500 branches to a decision step 510, where the Type field 104 of the WAKEUP message is read. If the Type field 104 is not NOTIFY, then the operation sequence 500 proceeds to decision step 550.

In decision step 550, the sequence determines if the Type field 104 is STATUS. If the Type field 104 is STATUS, then the operation sequence 500 proceeds to decision step 552. If not, then the operation sequence 500 proceeds to step 553 to process other message types. In decision step 552, the operation sequence 500 determines if the Status Code 134 equals Error. If it does not equal Error, then the operation sequence 500 continues to step 582 to reset the session timer and then continues to step 584 to notify the control plane 70.

Returning to decision step 552, if the Status Code 134 does equal Error, then the operation sequence 500 proceeds to step 554 and resets the session timer. Then the operation sequence 500 continues to step 556 to notify the control plane 70. The sequence then moves to step 558 to set the LABEL=Egress_RX, TTL=1, Type=DISABLE, update the internal message header, start the message timer, and transmit the message to the FCP 120.

Next, the operation sequence 500 continues to step 560 to locate the next protecting connection in the context of 1:N protection. Then the operation sequence 500 moves to decision step 562, and determines if there is an alternate path. If not, the operation sequence 500 proceeds to step 563 to notify the control plane 70 of the lack of the alternative path. However, if there is an alternate path, then the operation sequence 500 proceeds to step 564 to start off the session timer. Then, in step 566, the operation sequence 500 sets the LABEL=Egress_RX, TTL=1, Type=ENABLE, updates the internal messaging header starts the message timer, and transmits the message to the FCP 120.

Returning to decision step 510, if the Type field 104 does equal NOTIFY, then the operation sequence 500 moves to step 512, to notify the control plane 70. Next, the operation sequence 500 proceeds to step 514 to find out the TTL to the notifying node. In step 516, the operation sequence 500 sets the LABEL=Egress_RX, TTL=newly converted TTL, Type=STATUS, Status Code=OK, updates the internal messaging header, starts off message timer, and transmits the message to the FCP 120.

In the next step, 518, the operation sequence 500 sets the LABEL=Egress_RX, TTL=1, Type=DISABLE, updates the internal messaging header, starts the message timer, and transmits the message to the FCP 120. Upon receiving a notification message—the headend node A and/or H preferably actively disables the working or protecting connection by sending a deactivation message.

The operation sequence 500 then proceeds to decision step 520 to determine if the status code equals "preempted". If the status code does equal "preempted", the operation sequence 500 proceeds to step 560 and continues as described above. If not, then the operation sequence 500 proceeds to a step 561 and notifies the control plane 70 on failure conditions.

Other Events

In the previous sections, we have outlined some of the most complex scenarios in the context of operation. The rest of the events can be handled with a subset of the described operations.

CONCLUSION

Thus, it will be appreciated that in a mesh network 11 where an operator allocates a common set of network resources such as timeslots on nodes 10 or 10a to protect multiple working connections, there was not a known mechanism that can activate protecting connections in a timely fashion. The presently disclosed and claimed inventive concepts provide a generic signaling protocol that can activate protecting connections quickly and achieve traffic switchover in a milliseconds range preferably using in-band messaging directed by a fast control plane executing on the input and output interfaces 12 and 14; and/or the universal transport module 32. The presently disclosed concepts cover a broad range of scenarios including: support for both in-band and out-band messaging; the creation of a fast control plane that is executed by the universal transport module 32 for communication with the underlying optical connections preferably using an MPLS-based messaging protocol for efficient in-band messaging; the definition of a mechanism for connection diagnosis and on-demand resource availability checking in addition to the connection activation; the enablement of intermediate nodes 10 and/or 10a to dynamically allocate resources for protecting connections for more optimal resource utilization; and the methodology introduced here can apply to all transport networking scenarios including traffic protection and recovery.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

For example, while a series of blocks or nodes have been described with regard to FIGS. 3, 5, 13, 15, 17, 19, and 21, the order of the blocks may be modified in other implementations. Further, non-dependent blocks may be performed in parallel.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, while implementations have been described in the context of an optical network, this need not be the case. These implementations may apply to any form of circuit-switching network.

In addition, an implementation has been described where the connection information, such as the connection table(s) 150, logical timeslot table(s) 152, and the real timeslot table(s) 154 have been stored in a distributed fashion (distributed storage having multiple memory/storage devices) and processed in a distributed manner preferably by using a hop-to-hop processing and forwarding of WAKEUP messages. In another implementation, the distributed storage may be replaced by a centralized memory that stores the connection information for all, or a subset, of the nodes 10 or 10a. In this situation, the nodes 10 or 10a may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Also, as used herein, the article "a" is intended to include one or more items. Where only one item is intended, the term "one" or similar language is used. Further, the phrase "based on" is intended to mean "based, at least in part, on" unless explicitly stated otherwise.

REFERENCES

The following references are hereby incorporated herein by reference.
[1] RFC 4872: RSVP-TE Extensions for E2E GMPLS Recovery, J. P. Lang, Y. Rekhter, D. Papadimitriou, May 2007
[2] ITU-T Recommendation G.709 "Interfaces for the optical transport network (OTN)"
[3] RFC 3473—Generalized Multi-Protocol Label Switching (GMPLS) Signaling Resource ReserVation Protocol-Traffic Engineering (RSVP-TE) Extensions
[4] RFC3032—MPLS Label Stack Encoding
[5] RFC5586—Vigoureux, M., Bocci, M., Swallow, G., Aggarwal, R., and D. Ward, "MPLS Generic Associated Channel", May 2009.

What is claimed is:

1. A method comprising the steps of:
receiving a signal indicative of a failure of a working connection in a mesh network having a headend node, a tailend node and an intermediate node, and having a protecting connection; and
transmitting an activation message via the protecting connection from at least one of the headend node and the tailend node to the intermediate node for activating the protecting connection,
wherein the headend node includes a first line module and a second line module, and wherein the step of receiving the signal indicative of the failure of the working connection is defined further as receiving the signal indicative of the failure of the working connection by the first line module of the headend node, and wherein the step of transmitting the activation message is defined further as transmitting the activation message by the second line module of the headend node,
wherein the protecting connection is a first protecting connection, the intermediate node is a first intermediate node, and the activation message is a first activation message, and wherein the headend node waits for a message from the tailend node indicating that the first protecting connection is activated, and in an absence of receiving the message selects a second protecting connection and transmits a second activation message to a second intermediate node of the second protecting connection.

2. The method of claim 1, further comprising the step of transmitting traffic using the protecting connection.

3. The method of claim 1, wherein the step of transmitting is defined further as transmitting the activation message on a General Communication Channel of the protecting connection.

4. The method of claim 1, wherein the at least one of the headend node and the tailend node that transmits the activation message includes a control module and a switch, the control module storing first information identifying the first protecting connection, and wherein the method further comprises the steps of:
retrieving, by a first line module, the first information identifying the first protecting connection from the control module;
generating, by circuitry within the first line module, second information including the activation message;
supplying the second information to a second line module by bypassing the control module, the second line module being coupled to a link, the link being part of the protecting connection; and
activating, with circuitry provided in the second line module, the link in response to the second information, such that the second line module supplies data to the protecting connection.

5. The method of claim 1, wherein the activation message is transmitted using multiprotocol label switching protocols (MPLS) including an MPLS header.

6. The method of claim 5, wherein the activation message is transmitted as a network packet with a TTL parameter of 1.

7. A node, comprising:
an input interface for receiving traffic from a first communication link;
an output interface for transmitting traffic to a second communication link;
a switch for communicating the traffic from the input interface to the output interface; and
a control module utilizing GMPLS protocols and controlling the input interface, the output interface and the switch, the control module storing connection information indicative of a working connection, and at least one protecting connection,
wherein the input interface is configured to receive a signal indicative of a failure of the working connection, form an activation message to activate a first protecting connection, and pass the activation message to the output interface by using the switch and bypassing the control module,
wherein the input interface includes a first line module having one or more processors, and the output interface includes a second line module having one or more processors, and wherein the first line module uses the one or more processors to generate the activation message responsive to the first line module receiving the signal indicative of the failure of the working connection, and to supply the activation message to the second line module by bypassing the control module.

8. The node of claim 7, wherein the input interface is configured to download connection information indicative of the working connection from the control module, and to form the activation message utilizing the connection information.

9. The node of claim 7, wherein the output interface is connected to a link forming a part of the protecting connection, and wherein the output interface utilizes circuitry to supply the activation message to the link.

10. The node of claim 9, wherein the output interface is configured to supply the activation message on a General Communication Channel of the link.

11. A method, comprising:
detecting a fault in a working connection, the working connection being a first path in a mesh network including a plurality of nodes, one of the plurality of nodes including a first line module, a second line module and a control plane;

supplying, to the first line module, first information identifying a protecting connection for carrying data by the control plane, the protecting connection being a second path in the mesh network;

generating, with circuitry provided in the first line module, second information including an activation message for activating the protecting connection;

supplying the second information to the second line module by bypassing the control plane, the second line module being coupled to a link, the link being part of the protecting connection; and activating, with circuitry provided in the second line module, the link in response to the second information, such that the second line module supplies data to the protecting connection, wherein the protecting connection is a first protecting connection and the data is first data, the method further including the steps of:

supplying, to said one of the plurality of nodes, third information identifying a second protecting connection, the link being included in the second protecting connection; and determining a first priority associated with the first protecting connection and a second priority associated with the second protecting connection, wherein the step of activating the link is based on the first priority.

12. The method of claim 11, further including the step of: supplying a plurality of time-division multiplexed frames to said one of the plurality of nodes, one of the plurality of time-division multiplexed frames including the first information.

13. The method of claim 12, wherein said one of the plurality of time-division multiplexed frames includes a General Communication Channel (GCC), the GCC including the first information.

14. The method of claim 11, wherein said one of the plurality of nodes includes a first input and a second input, the method further including the steps of supplying third information including supervisory information associated with the mesh network to a first input of said one of the plurality of nodes and supplying the data to a second input of said one of the plurality of nodes.

15. The method of claim 14, wherein the supervisory information is carried by an input signal that complies with an Internet Protocol (IP).

* * * * *